US009948640B2

(12) United States Patent
Ignatchenko et al.

(10) Patent No.: US 9,948,640 B2
(45) Date of Patent: Apr. 17, 2018

(54) SECURE SERVER ON A SYSTEM WITH VIRTUAL MACHINES

(71) Applicant: OLogN Technologies AG, Triesen (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 14/449,732

(22) Filed: Aug. 1, 2014

(65) Prior Publication Data

US 2015/0039891 A1 Feb. 5, 2015

Related U.S. Application Data

(60) Provisional application No. 61/861,753, filed on Aug. 2, 2013.

(51) Int. Cl.
*H04L 29/06* (2006.01)
*G06F 9/455* (2018.01)
(Continued)

(52) U.S. Cl.
CPC ...... *H04L 63/0853* (2013.01); *G06F 9/45558* (2013.01); *G06F 21/53* (2013.01);
(Continued)

(58) Field of Classification Search
CPC .... G06F 21/575; G06F 21/53; G06F 9/45558; G06F 2221/2105; G06F 2009/45587; H04L 63/0853
See application file for complete search history.

(56) References Cited

U.S. PATENT DOCUMENTS

| 5,134,700 A | 7/1992 | Eyer et al. |
| 5,500,897 A | 3/1996 | Hartman, Jr. |

(Continued)

FOREIGN PATENT DOCUMENTS

| EP | 1 612 670 A2 | 1/2006 |
| EP | 2 045 753 A1 | 4/2009 |

(Continued)

OTHER PUBLICATIONS

Garfinkel et al, "Terra: A Virtual Machine-Based Platform for Trusted Computing" date: Oct. 19-22, 2003, Bolton Landing, New York, USA. Copyright 2003 ACM 1581137575/3/0010; pp. 1-14.*

(Continued)

*Primary Examiner* — Harunur Rashid
(74) *Attorney, Agent, or Firm* — Arnold & Porter Kaye Scholer LLP

(57) ABSTRACT

A system, an apparatus and a method for providing a secure computing environment may be provided. In one aspect, an apparatus may comprise a communication port and a computer processor coupled to the communication port. The computer processor may be configured to initialize a hypervisor, establish a first virtual machine under control of the hypervisor and execute code for a secure zone on the first virtual machine. To execute code for the secure zone, the computer processor may be further configured to verify an administrative task and execute the administrative task, which may include: establish a connection with an administrator device, ensure that the administrator device is one of a set of intended administrator devices, receive a command through the connection with the administrator device and establish a second virtual machine under control of the hypervisor. The command may relate to executing a task on the second virtual machine.

27 Claims, 15 Drawing Sheets

(51) Int. Cl.
*G06F 21/53* (2013.01)
*G06F 21/57* (2013.01)
(52) U.S. Cl.
CPC .. *G06F 21/575* (2013.01); *G06F 2009/45587* (2013.01); *G06F 2221/2105* (2013.01)

(56) References Cited

U.S. PATENT DOCUMENTS

| | | |
|---|---|---|
| 5,615,263 A | 3/1997 | Takahashi |
| 5,677,955 A | 10/1997 | Doggett et al. |
| 5,787,172 A | 7/1998 | Arnold |
| 5,815,571 A | 9/1998 | Finley |
| 5,832,206 A | 11/1998 | De Jesus et al. |
| 5,896,499 A | 4/1999 | McKelvey |
| 5,978,484 A | 11/1999 | Apperson et al. |
| 6,088,684 A | 7/2000 | Custy et al. |
| 6,091,823 A | 7/2000 | Hosomi et al. |
| 6,092,202 A | 7/2000 | Veil et al. |
| 6,163,771 A | 12/2000 | Walker et al. |
| 6,385,727 B1 | 5/2002 | Cassagnol et al. |
| 6,581,841 B1 | 6/2003 | Christoffersen |
| 6,862,641 B1 | 3/2005 | Strongin et al. |
| 7,065,654 B1 | 6/2006 | Gulick et al. |
| 7,337,314 B2 | 2/2008 | Hussain et al. |
| 7,350,194 B1 | 3/2008 | Alpern |
| 7,363,493 B2 | 4/2008 | Dotan |
| 7,574,479 B2 | 8/2009 | Morris et al. |
| 7,587,611 B2 | 9/2009 | Johnson et al. |
| 7,636,858 B2 | 12/2009 | Khan et al. |
| 7,681,046 B1 | 3/2010 | Morgan et al. |
| 7,774,619 B2 | 8/2010 | Paaske et al. |
| 7,779,252 B2 | 8/2010 | O'Brien et al. |
| 7,797,544 B2 | 9/2010 | Dillaway et al. |
| 7,853,531 B2 | 12/2010 | Lao et al. |
| 7,861,097 B2 | 12/2010 | Smeets et al. |
| 7,882,221 B2 | 2/2011 | Sailer et al. |
| 7,940,932 B2 | 5/2011 | Paksoy et al. |
| 7,979,696 B2 | 7/2011 | Kim et al. |
| 8,112,787 B2 | 2/2012 | Buer |
| 8,386,785 B2 | 2/2013 | Kim et al. |
| 8,656,482 B1 | 2/2014 | Tosa et al. |
| 8,949,929 B2 | 2/2015 | Kelly et al. |
| 8,959,183 B2 | 2/2015 | Zeller et al. |
| 9,015,703 B2* | 4/2015 | Fitzgerald ............ G06F 9/45537 718/1 |
| 2002/0062438 A1 | 5/2002 | Asay et al. |
| 2002/0183056 A1 | 12/2002 | Lundblade et al. |
| 2003/0051169 A1 | 3/2003 | Sprigg et al. |
| 2004/0010565 A1 | 1/2004 | Hong et al. |
| 2005/0005161 A1 | 1/2005 | Baldwin |
| 2005/0268103 A1 | 12/2005 | Camenisch |
| 2006/0010447 A1 | 1/2006 | Egashira et al. |
| 2006/0047959 A1 | 3/2006 | Morais |
| 2006/0101408 A1 | 5/2006 | Kotamarthi et al. |
| 2006/0107268 A1* | 5/2006 | Chrabieh ............ G06F 9/4881 718/100 |
| 2006/0117177 A1 | 6/2006 | Buer |
| 2006/0168663 A1 | 7/2006 | Viljoen et al. |
| 2006/0259790 A1 | 11/2006 | Asokan et al. |
| 2007/0226807 A1 | 9/2007 | Ginter et al. |
| 2008/0155540 A1* | 6/2008 | Mock ............ G06Q 10/06 718/100 |
| 2008/0208758 A1 | 8/2008 | Spiker |
| 2008/0270786 A1 | 10/2008 | Brickell et al. |
| 2008/0306876 A1 | 12/2008 | Horvath et al. |
| 2008/0316357 A1 | 12/2008 | Achari et al. |
| 2009/0072032 A1 | 3/2009 | Cardone et al. |
| 2009/0165141 A1 | 6/2009 | Kakehi et al. |
| 2009/0172329 A1 | 7/2009 | Paver et al. |
| 2009/0172411 A1 | 7/2009 | Kershaw et al. |
| 2009/0210705 A1 | 8/2009 | Chen |
| 2009/0254986 A1 | 10/2009 | Harris et al. |
| 2009/0271618 A1 | 10/2009 | Camenisch et al. |
| 2009/0300263 A1 | 12/2009 | Devine et al. |
| 2009/0300348 A1 | 12/2009 | Aciicmez et al. |
| 2009/0313468 A1 | 12/2009 | Hazlewood et al. |
| 2009/0320048 A1* | 12/2009 | Watt ............ G06F 9/4812 719/319 |
| 2010/0031047 A1 | 2/2010 | Coker, II et al. |
| 2010/0145854 A1 | 6/2010 | Messerges et al. |
| 2010/0192230 A1* | 7/2010 | Steeves ............ H04L 63/08 726/26 |
| 2010/0269179 A1 | 10/2010 | Fahrny |
| 2010/0293099 A1 | 11/2010 | Pauker et al. |
| 2011/0029771 A1 | 2/2011 | Mehta et al. |
| 2011/0087887 A1 | 4/2011 | Luft et al. |
| 2012/0072346 A1 | 3/2012 | Barkan Daynovsky et al. |
| 2012/0137117 A1* | 5/2012 | Bosch ............ G06F 21/572 713/2 |
| 2012/0191575 A1 | 7/2012 | Vilke |
| 2012/0240194 A1 | 9/2012 | Nack Ngue |
| 2013/0047034 A1 | 2/2013 | Salomon et al. |
| 2013/0055347 A1 | 2/2013 | Chawla et al. |
| 2013/0124415 A1 | 5/2013 | Mardikar |
| 2013/0232339 A1 | 9/2013 | Ignatchenko et al. |
| 2013/0238786 A1 | 9/2013 | Khesin |
| 2013/0262891 A1 | 10/2013 | Gudlavenkatasiva et al. |
| 2013/0275306 A1 | 10/2013 | Ignatchenko et al. |
| 2013/0276064 A1 | 10/2013 | Ignatchenko et al. |
| 2013/0283353 A1 | 10/2013 | Ignatchenko et al. |
| 2013/0339742 A1 | 12/2013 | Ignatchenko et al. |
| 2013/0346747 A1 | 12/2013 | Ignatchenko et al. |
| 2013/0346760 A1 | 12/2013 | Ignatchenko |
| 2014/0096182 A1 | 4/2014 | Smith |
| 2014/0143538 A1 | 5/2014 | Lindteigen |
| 2014/0196127 A1 | 7/2014 | Smeets et al. |
| 2014/0279562 A1 | 9/2014 | Ignatchenko et al. |
| 2014/0281500 A1 | 9/2014 | Ignatchenko |
| 2014/0281560 A1 | 9/2014 | Igantchenko et al. |
| 2014/0281587 A1 | 9/2014 | Ignatchenko |
| 2014/0282543 A1 | 9/2014 | Igantchenko et al. |
| 2015/0089244 A1 | 3/2015 | Roth et al. |
| 2016/0366139 A1 | 12/2016 | Ignatchenko et al. |

FOREIGN PATENT DOCUMENTS

| | | |
|---|---|---|
| EP | 2 107 486 A2 | 10/2009 |
| EP | 2 113 855 A1 | 11/2009 |
| EP | 2 278 514 A1 | 1/2011 |
| WO | 2001/017296 A1 | 3/2001 |
| WO | 2009/071734 A1 | 6/2009 |
| WO | 2009/111409 A1 | 9/2009 |
| WO | 2011/037665 A2 | 3/2011 |
| WO | 2012/014231 A1 | 2/2012 |

OTHER PUBLICATIONS

Alsouri et al., "Group-Based Attestation: Enhancing Privacy and Management in Remote Attestation," *Trust and Trustworthy Computing*, 63-77 (Jun. 2010).

Anderson et al. "Cryptographic Processors—a survey", *Technical Report*, No. 641, University of Cambridge Computer Laboratory (Aug. 2005) (http://www.cl.cam.ac.uk/techreports/UCAM-CL-TR-641.pdf).

Anonymous, "TrustZone System Security by ARM the Architecture for the Digital World," retrieved from the Internet at http://www.arm.com/products/processors/technologies/trustzone/index.php (2014).

Chen et al., "A New Direct Anonymous Attestation Scheme from Bilinear Maps," 2008. ICYCS 2008. *The 9th International Conference for Young Computer Scientists*, 2308-2313 (2008).

Garfinkel, "Terra: a virtual machine-based platform for trusted computer," *ACM SOSP. Proceedings of the ACM Symposium on Operating Systems Principles*, 193-206 (2003).

Guo et al., "A New DAA Scheme From One-off Public Key," *Electronics, Communications and Control (ICECC), 2011 International Conference*, 646-649 (Sep. 2011).

International Search Report and Written Opinion issued in PCT/IB2013/000680 dated Sep. 5, 2013.

International Search Report and Written Opinion issued in PCT/IB2013/000672, dated Jul. 23, 2013.

(56) References Cited

OTHER PUBLICATIONS

International Search Report issued in PCT/IB2013/000741 dated Dec. 12, 2013.
International Search Report and Written Opinion issued in PCT/IB2014/059638 dated Jul. 3, 2014.
International Search Report and Written Opinion issued in PCT/IB2014/059839 dated Aug. 7, 2014.
International Search Report and Written Opinion issued in PCT/IB2014/059845 dated Aug. 8, 2014.
Liu et al., "A Remote Anonymous Attestation Protocol in Trusted Computing," *Parallel and Distributed Processing, 2008. IPDPS 2008, IEEE International Symposium*, 1-6 (2008).
Manulis et al., "UPBA: User-Authenticated Property-Based Attestation," *Privacy, Security and Trust (PST), 2011 Ninth Annual International Conference*, 112-119 (2011).
Suh et al., "AEGIS: Architecture for Tamper-Evident and Tamper-Resistant Processing," Computation Structures Group Memo 461, CSAIL Computer Science and Artificial Intelligence Laboratory, Massachusetts Institute of Technology (Feb. 2003).
Sun et al., "A Strict Inter-Domain Anonymity Attestation Scheme," *Computer Design and Applications (ICCDA), 2010 International Conference*, V3-291-V3-295 (2010).
Tanveer et al.,"Scalable Remote Attestation with Privacy Protection (Work in Progress)," *Trusted Systems*, 73-87 (Dec. 2009).
Yu et al., "An anonymous property-based attestation protocol from bilinear maps," *Computational Science and Engineering, 2009. CSE '09, International Conference*, 2:732-738 (2009).
Yu et al., "Real-Time Remote Attestation with Privacy Protection," *Trust Privacy and Security in Digital Business*, 81-92 (Aug. 2010).
Zhang et al., "Improving Privacy of Property-based Attestation without a Trusted Third Party," *Computational Intelligence and Security (CIS), 2011 Seventh International Conference on Computational Intelligence and Security*, 559-563 (2011).
Bare, "Attestation and Trusted Computing," XSEP 590: Practical Aspects of Modern Cryptography, 1-9 (2006).
Berger et al., "vTPM: Virtualizing the Trusted Platform Module," Security '06: $15^{th}$ USENIX Security Symposium, *USENIX Association*, pp. 305-320 (2006).
International Search Report and Written Opinion issued in PCT/IB2014/063637 dated Nov. 18, 2014.
Stumpf et al., "Improving the Scalability of Platform Attestation," Proceedings of the $3^{rd}$ ACM workshop on Scalable trusted computing, *ACM*, pp. 1-10 (2008).

\* cited by examiner

| | |
|---|---|
| Supervisor 160 | Virtual machine "VM-S" 512 |
| Non-secure system 152 | Virtual machine "VM-NS" 514 |
| Task 170 | Virtual machine "VM-T" 516 |
| Administrator's Task 175 | Virtual machine "VM-AT" 517 |
| Bus 151 | Bus memory block 182 |
| Task Interface 172 | Task Interface memory block 188 |
| Administrator's Task Interface 177 | Administrator's Task Interface memory block 185 |

FIG. 4

SECURE SERVER ON A SYSTEM WITH VIRTUAL MACHINES

RELATED APPLICATIONS

This application claims priority to U.S. Provisional Application No. 61/861,753, filed Aug. 2, 2013, entitled "A Secure Server On A System with Virtual Machines," the content of which is incorporated herein by reference in its entirety.

FIELD OF THE DISCLOSURE

The systems, methods and apparatuses described herein relate to the security of computer systems, and in particular, executing multiple sensitive tasks related to commercial and other data transactions in different virtual machines running on a computing device.

BACKGROUND

Internet shopping, online banking, and other network-based forms of transmitting sensitive data are highly popular, but both the computer servers hosting the online services and the client computing devices consuming the online services may be susceptible to a variety of security breaches resulting from computer viruses, backdoors, keyloggers and other forms of attacks on the servers and the client computing devices. These attacks generally relate to vulnerabilities in the operating systems of the computer servers and the client computing devices that are used to access the network.

Existing solutions either rely on software alone (such as anti-virus software) or limited hardware support for storing cryptographic keys using a secure cryptoprocessor (such as the Trusted Platform Module (TPM)). Neither separates the sensitive tasks from the non-sensitive tasks in order to provide heightened security protection to the sensitive tasks. What is needed is a suitable computing environment to implement security solutions that separates the sensitive tasks from the non-sensitive tasks, and in particular, take advantage of virtual machine technologies to provide separate computing resources to sensitive tasks and non-sensitive tasks.

BRIEF DESCRIPTION OF THE DRAWINGS

FIG. 4 is a mapping of some of the components of the implementation of FIG. 1A to the components of the implementation of FIG. 3A according to the present disclosure

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure provides systems, methods and apparatuses for performing computer-based actions or transactions in a secure environment. In one non-limiting example, a computer processor according to the present disclosure may execute a task on a first virtual machine of a computer system and an operating system on a second virtual machine of the computer system. The operating system (OS) may implement drivers to communicate with hardware elements of the computer system and the task is configured to rely on the OS to access the hardware elements.

Figure 1A:
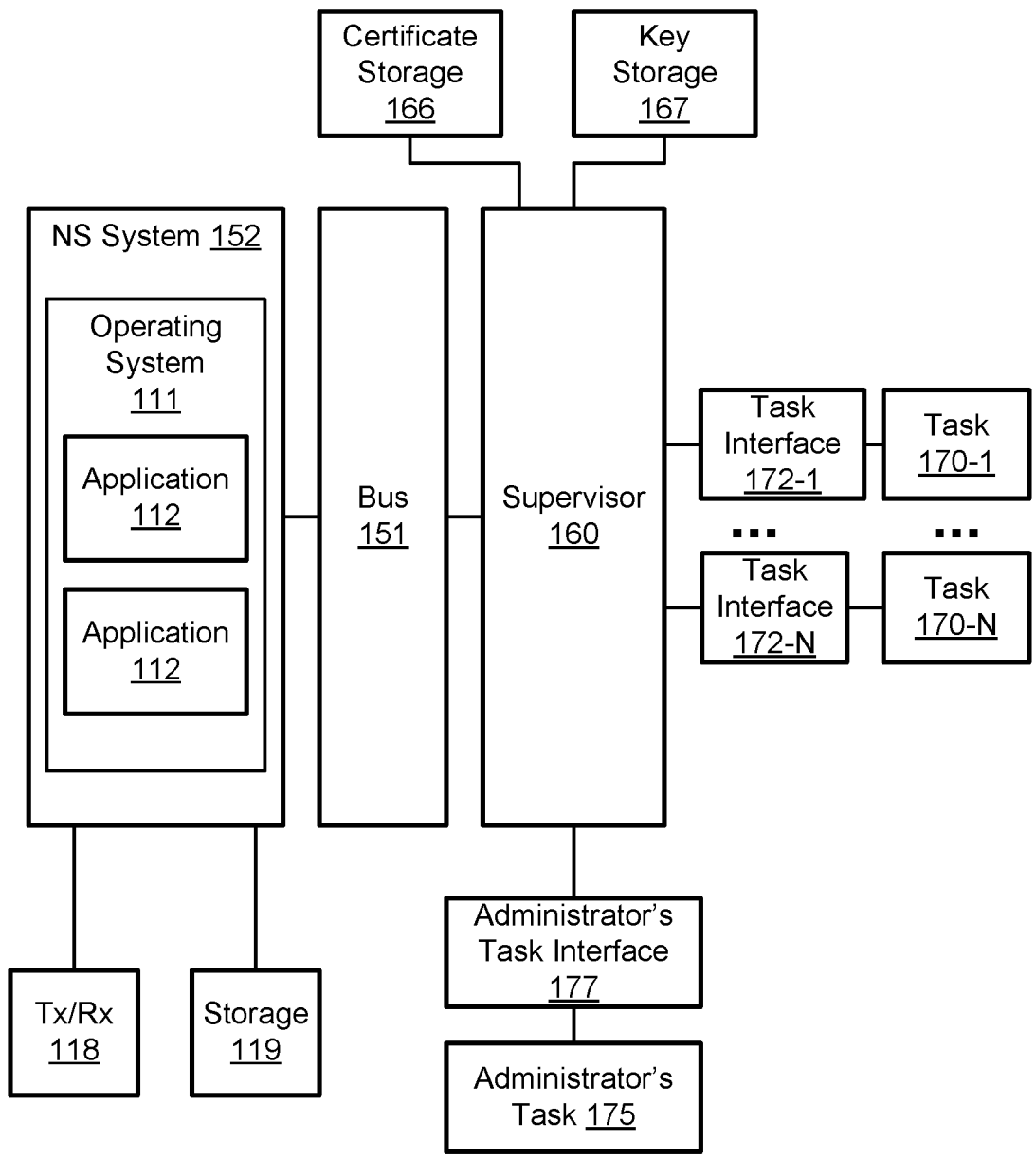
FIG. 1A is a block diagram of an exemplary system according to the present disclosure.

FIG. 1A shows an exemplary system 100 according to the present disclosure. The system 100 may comprise a non-secure (NS) system 152, a supervisor 160, and a bus 151 between the NS system 150 and the supervisor 160. Further, the system 100 may comprise one or more tasks 170-1, ... 170-N (with N being any positive integer number) that communicate with the supervisor 160 via respective task interfaces 172-1, ... 172-N. In addition, the system 100 may comprise a communication port 118 and data storage 119 coupled to the NS system 152, and a certificate storage 166 and key storage 167 coupled to the supervisor 160.

The supervisor 160 may be part of the system 100 that is used to control access to various system components. For example, the supervisor 160 may control access to physical memory used by a task 170 for the task's operations. Further, the supervisor 160 may be used to enforce certain operational rules to provide certain security guarantees to the task end-user. For example, in one embodiment, the supervisor 160 may be configured to: (1) receive a task; (2) check that certain requirements (as described in greater detail below) are fulfilled for this task; (3) if requirements are fulfilled, load this task into one or more physical memory segments; (4) clear one or more physical memory segments; (5) initiate execution of the task; (6) control one or more peripherals within the computing device; and/or (7) clean up (to the extent required) after the task has been executed. In addition, the Supervisor 160 may provide certain interfaces, such as communication or storage interfaces, for any tasks 170 being executed. Each of these functions will be described in greater details below. In some embodiments, the supervisor 160 may be implemented such that it cannot be affected or modified. For example, if the supervisor 160 is implemented as software, the integrity of the supervisor may be ensured by storing instructions and data of the supervisor 160 within a physically protected ROM (which may be, for example, implemented as a tamper-protected non-volatile storage). In another example, the integrity of the supervisor 160 may be ensured by encrypting the instructions and/or data comprising the supervisor 160 and checking the integrity after decryption, for example, as described in U.S. Provisional Patent Application No. 61/785,388, entitled "Systems, Methods and Apparatuses for Using a Secure Non-Volatile Storage With a Computer Processor," filed on Mar. 14, 2013 (the '388 application), the content of which is incorporated herein by reference in its entirety. In yet another example, the integrity of the instructions and data comprising the supervisor 160 may be verified by comparing a hash (or hashes) of the instructions and data of the supervisor 160 with a pre-defined hash (or hashes) stored in a physically protected ROM.

Each task 170 may comprise executable task code, associated task data and a set of permissions. The permissions may prescribe access rights to various system resources including network access, storage access and/or peripheral device access. For example, the permissions may indicate that the task is allowed to accept requests to establish secure connections with some or all clients, and is not allowed to permanently store any data. In addition, each task 170 may be signed and, in some embodiments, encrypted. In some embodiments, the digital signature may cover task permissions such that if the task permissions are modified after the task is signed, the signature may become invalid. Exemplary tasks may include the tasks and subtasks described in U.S. Non-provisional patent application Ser. No. 13/861,724, entitled "Secure Zone for Digital Communications," and filed on Apr. 12, 2013 (the '724 application), and U.S. Non-provisional patent application Ser. No. 13/866,687, entitled "Secure Zone for Secure Purchases," and filed on Apr. 19, 2013 (the '687 application), the content of both applications are incorporated herein by reference in their entireties.

The executable task code may be executed in a secure manner. For example, when the task code for one task 170 is executed, the task's data may be protected against access by other parts of the system 100, such as the NS system 152 and any applications running in it, and/or other tasks 170. In addition, a task 170 may have associated task permissions (which in some embodiments may be signed by the task signer). The task permissions may include, for example, permissions to accept connection requests with certain third parties, to store data locally, to access certain hardware, and the like.

To enhance security, a task 170 may be executed using a segment of physical memory that cannot be accessed by other tasks 170 or code running in the NS system 152. Further, in some embodiments the memory for the task 170 may be separated into an instruction memory segment and a data memory segment so that only instructions located in the instruction memory segment may be executed, and no data may be stored within the instruction memory segment.

In some embodiments the system 100 may have an administrator's task 175. The task 175 may be a special task in control of establishing communication between the supervisor 160 and an administrator of the system 100. For example, through this task 175, an administrator of the system 100 may send commands to load or terminate certain tasks 170 and/or to receive certain feedback from the supervisor 160, such as a confirmation that the requested command has been performed, or information if certain task 170 is still running. The administrator's task 175 may have a special set of permissions collectively allowing it to perform operations as described herein. In addition, in some embodiments, the administrator's task 175 may have a special permission indicating that this task is designed and signed as an administrator's task. This administrator's task 175 may communicate with the supervisor 160 via the administrator's task interface 177. In some embodiments the supervisor 160 may implement some or all functionality of the administrator's task 175.

The NS system 152 may run any kind of code, which may include one or more operating systems 111 (such as, for example, Windows, Linux, or Unix operating systems) that may be used for providing certain services to the supervisor 160 and/or to tasks 170. The services may include, for example, network communication services, access to local storage, and/or access to one or more of local hardware peripheral devices. In some embodiments, the NS system 152 may run an OS 111 with one or more applications 112. The OS 111 and one or more applications 112 may collectively provide the services to the supervisor 160. The NS system 152, for example, may implement a driver to access the communications port 118 and/or a TCP/IP stack to provide communication services to the supervisor 160 and/or to tasks. The communications port 118 may enable the NS system 152 to communicate with other devices such as remote computers over a network connection.

The NS system 152 may also have access to a storage 119 of the system 100. The storage 119 may be used by the NS system 152 for permanently storing information including, for example, data, code, applications, etc. The information stored in the storage 119 may include, for example, data received from the bus 151, and/or data associated with the OS 111, and/or the applications 112. The NS system 152 may also retrieve the data stored on the storage 119 when the data is needed and send the retrieved data to the supervisor 160. In some embodiments, the storage 119 may be internal to an apparatus implementing the system 100. For example, the storage 119 may be one or more internal hard disk drives or solid state drives located in the physical case of the apparatus. In other embodiments, the storage 119 may be external to the apparatus. For example, the storage 119 may be any kind of data storage that may be accessed locally or remotely, such as, for example, via a USB port (not shown), or via the communication port 118.

In addition, the system 100 may comprise one or more certificate storages, represented by a certificate storage 166 shown in FIG. 1A. In some embodiments, the certificate storage 166 may be implemented, for example, as read-only, non-volatile memory. The certificate storage 166 may store one or more root certificates of one or more Certification Authorities (CA), which, in turn, may be used for certificate validation. The system 100 may additionally comprise one or more key storages represented by a key storage 167 in FIG. 1A. The key storage 167 may be implemented, for example, as non-volatile memory and may be used, for example, for the storage of one or more keys for data encryption and/or decryption. The keys may include private key(s), one or more corresponding public key(s) or associated digital certificates, and/or a unique device identifier. In some embodiments, the certificate storage 166 and the key storage 167 may be exclusively accessed by the supervisor 160.

The bus 151 may be a communication interface between the supervisor 160 and NS system 152. In some embodiments, the bus 151 may be implemented as a memory block with its access shared by the supervisor 160 and NS system 152. That is, the bus 151 may be a memory buffer shared between the supervisor 160 and NS system 152.

It should be noted that the various components of the system 100 shown in FIG. 1A may include both physical components and logical components. For example, in some embodiments, as will be described in details below, one or more of the NS system 152, supervisor 160, various tasks (including the tasks 170 and administrator's task 175) may be logical components that may be established on one or more CPUs during execution of software code. Moreover, in these embodiments, the bus 151 and task interfaces (including the task interfaces 172 and the administrator's task interface 177) may be implemented by shared memory blocks.

Figure 1B:
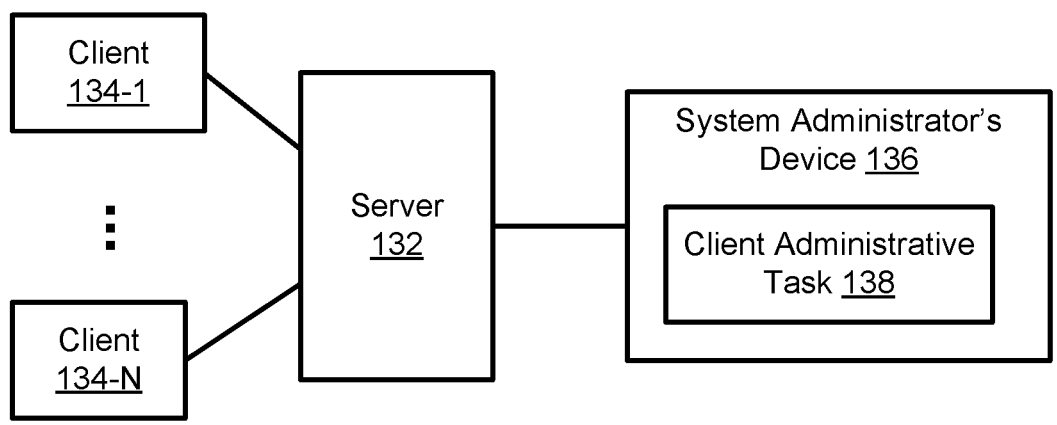
FIG. 1B is a block diagram of an exemplary system according to the present disclosure.

In some embodiments a system 100 may be a part of a secure cloud system 130 as shown on FIG. 1B. A secure cloud system 130 may comprise a server 132, a number of client devices 134-1 through 134-N (where N is a positive integer), and a system administrator's device 136. The server 132 may be an embodiment of the system 100, and each of the client devices 134 and the system administrator's device 136 may be legitimate secure devices. In some embodiments, a secure device may be a computing device having a secure zone as described in the '724 application or as described in U.S. Provisional Patent Application No. 61/808,774, entitled "Secure Zone on a Virtual Machine for Digital Communications," filed on Apr. 5, 2013 (the '774 application), the content of which is incorporated herein by reference in its entirety. For example, the system administrator's device 136 may have a secure zone that runs a client administrative task 138. In this cloud system 130, one or more tasks running under the control of the supervisor 160 of the server 132 may have a permission to accept connections from only those client devices that are secure and not compromised. Correspondingly, before passing an established connection to a task, the supervisor 160 may first ensure that the connection is established with one of legitimate secure devices that are not reported as compromised using, for example, a method described in U.S. Provisional Patent Application 61/788,326, filed Mar. 15, 2013, entitled "Systems, Methods and Apparatuses for Remote Attestation," (the '326 application). In other embodiments, a list of public keys of the secure client devices that are allowed to establish a connection with a task may be supplied together with the task code and data when the task is being loaded. Such a list may be signed by a private key of the task signer. Alternatively, such a list may be covered by the task signature, or form a part of one of the task certificates which may be used to validate a task signature. Moreover, in some embodiments, such a list may be a part of task permissions. It should be noted that an attacker may want to compromise a secure client device 134 first when trying to compromise the server 132 (and, consequently, the whole cloud system 130) and the secure client device 134 may be harder to compromise than an ordinary client device.

Figure 10:
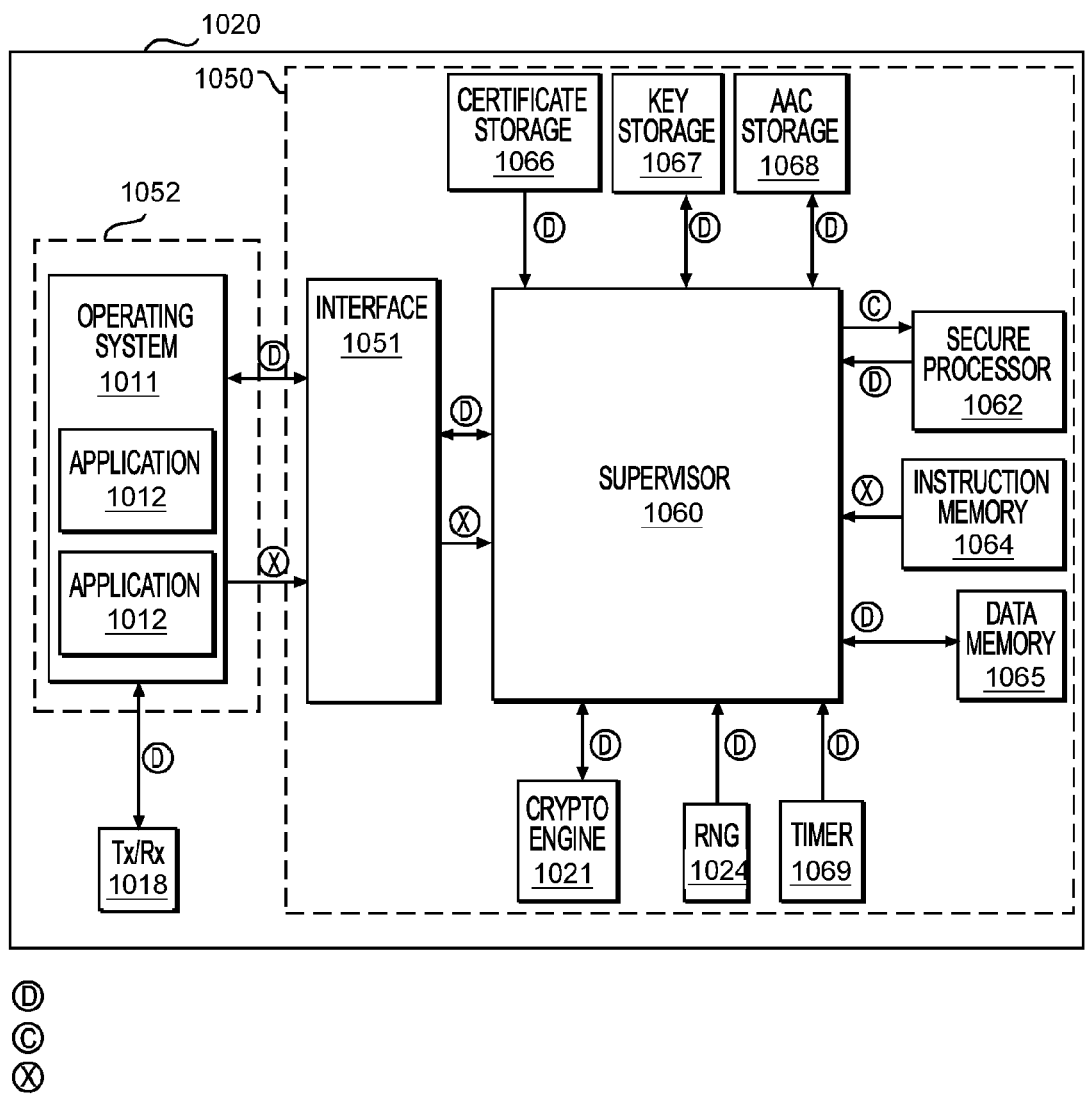
FIG. 10 shows an exemplary secure device according to the present disclosure.

FIG. 10 illustrates an exemplary secure device 1020 that may be used as an administrator device or a client device. The exemplary secure device 1020 may have an attestation certificate issued by a trusted attestation service provider, which may keep a list of trusted and uncompromised secure zones stored in a database, as shown and described in the '326 application. The server 132 may request the attestation certificate from the exemplary secure device 1020 and verify that the attestation certificate is issued by the trusted attestation service provider to attest legitimacy of the exemplary secure device 1020. FIG. 10 shows one example by which a secure zone 1050 may be implemented in a computing device 1020, such as a computer, laptop, smart phone, smart television set, set-top box, etc. As shown in FIG. 10, a secure zone 1050 may comprise an interface 1051 to one or more non-secure zones 1052. The term "non-secure zone," as used herein, refers to any device, processor, other object, operating system, or application, or combination thereof, that is capable of providing messages, codes, tasks or other information to a secure zone 1050. For example, in the exemplary embodiment shown on FIG. 10, the non-secure zone 1052 may comprise an operating system 1011 and one or more applications 1012. The interface 1051 may be configured to receive these messages, codes or tasks from the non-secure zone 1052. For example, if a secure zone 1050 is implemented in a laptop, the interface 1051 may be implemented as some kind of bus (for example, a PCIe bus) and may be configured to receive messages, executable code, tasks or other information from the laptop's central processing unit. If the secure zone 1050 were implemented in a television, the interface 1051 again might be implemented, for example, as some kind of bus (for example, an I2C bus), and configured to receive messages, executable code, tasks or other information from a separate set-top box or from the microcontroller unit of the television.

A secure zone 1050 may further comprise a supervisor 1060 coupled to the interface 1051. The supervisor 1060 may be used to control access to the components of the secure zone 1050, and may be used to enforce certain operational rules of the secure zone 1050 to provide certain security assurances to the end-user. For example, in one embodiment, the supervisor 1060 may be configured to: (1) receive a task or executable code that can be run on one or more processors 1062 within the secure zone 1050; (2) verify any digital certificates associated with this task or code; (3) if one or more predetermined requirements are fulfilled, instruct a processor 1062 within the secure zone 1050 to execute the task or code; and/or (4) clean up (to the extent required) after the task or code has been executed. In one embodiment, the supervisor 1060 may be implemented in hardware within the secure zone 1051, such that the supervisor 1060 cannot be affected or modified.

For example, the supervisor 1060 may be configured to fulfill one or more tasks as described in the '724 application or '687 application.

In general, code or application refers to a set of instructions that may be executed on a computing device whereas task refers to the combination of the executable code and associated data that may be operated on by the secure zone.

Throughout this disclosure, the terms task, code, executable code, or other similar terms may be used interchangeably to refer to any executable set of instructions (and, as appropriate, any associated data). Those with ordinary skill in the art recognize that, depending on the situation and context, the secure zone may execute code that has no associated data. Thus, references to code are not intended to imply that data is necessarily excluded, and references to tasks are not intended to imply that data is necessarily included.

Additionally, the supervisor 1060 may be configured to obtain and/or process one or more anonymous attestation certificates (AACs) from a third-party attestation service. The supervisor 1060 may be further configured to use one or more AACs for the purpose of assuring a remote server (or other remote entity) with which the computing device 1020 is communicating that (1) the computing device 1020 has a legitimate secure zone 1050 (rather than, for example, a software emulator emulating a secure zone), and/or (2) that the secure zone 1050 is not known to be compromised at the time the AAC is issued. An AAC may be obtained by making a request to the attestation service and may be submitted to a remote server when establishing a connect to the remote server. Exemplary processes for acquiring an AAC and for using an AAC to attest secure zones (or particular tasks running within a secure zone) are described in the '326 application.

The secure zone 1050 may also comprise a secure processor 1062, an instruction memory 1064 and a data memory 1065. The secure processor 1062 may be configured to execute code loaded into the instruction memory 1064 and to exchange data with the non-secure zone 1052 through the interface 1051. The secure processor 1062 may be a general purpose processor or any suitable form of special purpose processor. In some embodiments, the secure processor 1062 may be implemented as hardware separate from the supervisor 1060; in some other embodiments, the supervisor 1060 and the secure processor 1062 may be implemented using the same hardware. In addition, it will be understood that while FIG. 10 shows the secure processor 1062 as having a so-called "Harvard architecture" (with separate instruction memory 1064 and data memory 1065), other architectures (like the ubiquitous von Neumann architecture) may be used as long as equivalent instruction and data restrictions are enforced by the supervisor 1060. By way of example and not limitation, the XN bit may be used in ARM® processors to provide some separation of data memory from instruction memory, as long as the XN bit in appropriate memory areas is enforced by the supervisor 1060 and cannot be altered by code running within the secure zone 1050. Similar separation may be achieved on x86 architecture by using the NX bit (also known as the XD bit on INTEL® CPUs and as Enhanced Virus Protection on AMD® CPUs).

In certain embodiments, the secure zone 1050 may further comprise one or more cryptographic engines represented by a cryptographic engine 1021 shown in FIG. 10. The cryptographic engine 1021 may be used by the supervisor 1060, among other things, in support of digital certificate verification. The cryptographic engine 1021 may be configured to implement one or more symmetric and/or asymmetric cryptographic algorithms, such as Advances Encryption Standard (AES) algorithm, the RSA algorithm or any other existing or future-developed cryptographic algorithm. The cryptographic engine 1021 may receive data from the supervisor 1060 for encryption or decryption, and may provide the resulting ciphertext (or plaintext, as appropriate) back to the supervisor 1060. The secure zone 1050 may also comprise a random number generator (RNG) 1024 to provide support to cryptographic processes. In other embodiments, the supervisor 1060 may be configured to perform some or all of the functionality of the cryptographic engine 1021 and/or random number generator 1024, and a separate cryptographic engine 1021 or RNG 1024 may not be required.

In some embodiments, the instruction memory 1064 and data memory 1065 may be implemented as volatile memory. The absence of persistent writable storage for executable code may ensure that no viruses, back-doors, or other malicious code may be installed within the secure zone 1050. In addition, the secure zone 1050 may contain one or more certificate storages, represented by a certificate storage 1066 shown in FIG. 10, which may be implemented as read-only, non-volatile memory. The certificate storage 1066 may store one or more root certificates of one or more Certification Authorities (CA), which, in turn, may be used for certificate validation.

The secure zone 1050 may additionally comprise one or more key storages represented by a key storage 1067 in FIG. 10. The key storage 1067 may be implemented, for example, as non-volatile memory and may be used, for example, for the storage of one or more private keys (which can be generated, for example, by the supervisor 1060 using RNG 1024), one or more corresponding public key(s), and/or a unique device identifier. This information may be used, among other uses, to identify and/or authenticate the secure zone 1050.

The secure zone 1050 may further comprise one or more AAC storages, represented by an AAC storage 1068 in FIG. 10. The AAC storage 1068 may be implemented, for example, as a non-volatile memory and may be used to store one or more AACs which can be used to reliably attest the secure zone 1050. The process by which AACs may be acquired and used for task attestation is described in greater detail herein.

In addition, the secure zone 1050 may include a timer 1069, which may be used, for example, to determine whether time restricted certificates and AACs remain valid. One exemplary implementation of a secure timer 1069 is described in U.S. Provisional Patent Application No. 61/661,248, entitled "Systems, Methods and Apparatuses for Secure Time Management," and filed on Jun. 18, 2012, the entirety of which is hereby incorporated by reference.

The secure zone 1050 may be physically secured, such that it is tamper-resistant. The secure zone 1050 may also (alternatively, or in addition to being tamper-resistant) incorporate one or more tamper detection techniques. For example, several tamper-resistant methods for protecting cryptographic processors are already known and have been described in the art; see http://www.cl.cam.ac.uk/techreports/UCAM-CL-TR-641.pdf. In some embodiments, it may be desirable, for example, to manufacture the secure zone 1050 within a single chip. In another embodiment, the secure zone 1050 might have a secure enclosure. In some of these embodiments, the secure zone 1050 may be configured to execute one or more possible responses if it detects that the chip's integrity has been compromised, and/or if it detects penetration of the secure enclosure. These responses may vary from erasing sensitive data to the physical destruction of all or part of the secure zone 1050.

Figure 2A:
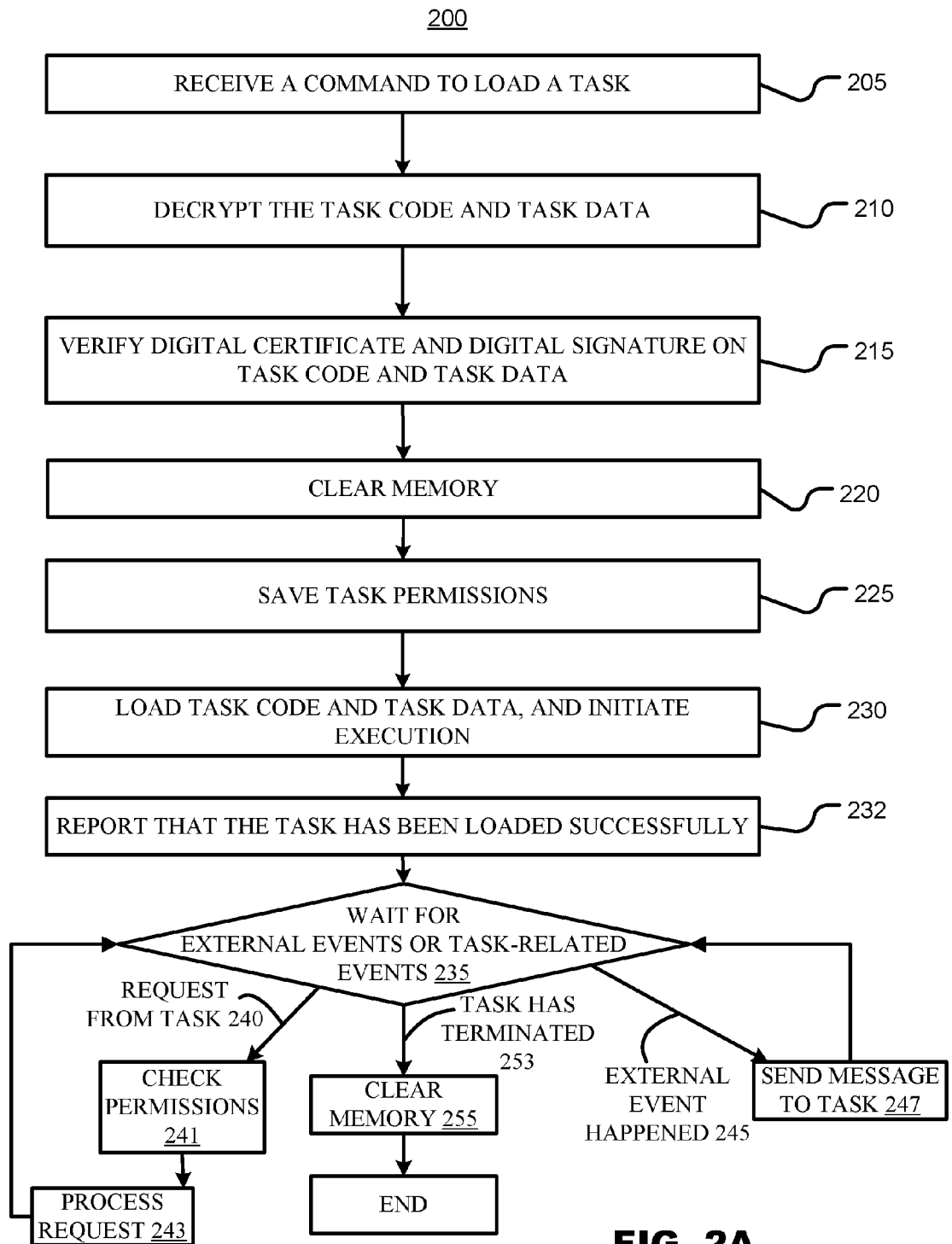
FIG. 2A is a flow diagram illustrating an exemplary method by which a system according to the current disclosure may accept a task for execution; organize the process of task execution; and cleanup after task execution.

FIG. 2A is a flow diagram illustrating an exemplary method 200 by which a system according to the current disclosure may accept a task for execution, organize the process of task execution, and cleanup after task execution. At block 205, a command to load a task may be received. For example, the supervisor 160 of the system 100 may receive a command via the administrator's task 175 to load a task 170. Such a command may, for example, include executable task code and task data related to the task to be loaded, and optionally a signature of the task code and task data. Such a signature may be implemented, for example, as a cryptographic hash (such as SHA-1 or SHA-256) of the task signed by a trusted private key. Other digital signature methods, both known at present and developed in the future, may also be used within the scope of present disclosure.

Further, in some embodiments, the task code and related task data may be encrypted, for example, with a public key that corresponds to a private key stored in the key storage 167. In some embodiments, the task provider may encrypt the task (and any related task data) before sending it to the supervisor 160, thus, at optional block 210, the method 200 may decrypt the task code and task data. For example, in some embodiments the task provider may have used a public key corresponding to a private key of the supervisor 160 to encrypt the task. The private key of the supervisor 160 may have been previously stored in the key storage 167, and may be used by the supervisor 160 to decrypt the task. Thus, at block 210, if the task has been encrypted using a public key of the supervisor 160, the supervisor 160 may extract a copy of the corresponding private key from the key storage 167 and decrypt the task (and any associated data, if applicable) using this private key.

At block 215, the method 200 may verify the digital signature on the task code and task data. For example, in addition to or in place of being encrypted, the task (including the task code and task data) may have been digitally signed using the task provider's private key, guaranteeing the authenticity of the task. To enable validation of the digital signature and the signed task, a digital certificate capable of authenticating the task provider may be provided with the task, enabling usual PKI-style signature validation, for example, using a PKI-style certificate authority. In such an implementation, the certificate (or public key) of the certificate authority may have been stored in the certificate storage 166. In some embodiments, instead of a single certificate, entire "certificate chains" may be included with the task. In other embodiments, alternative ways of obtaining certificates (for example, issuing a request to a server (not shown) via the OS 111 and communications port 118) may be used.

In one example of signature validation, if the task provider's certificate were signed by a certificate authority such as VeriSign Inc, the supervisor 160 may take a copy of the appropriate VERISIGN root certificate from the certificate storage 166 and verify that the private key which corresponds to the public key within this root certificate was used to sign the task provider's certificate by performing a public key infrastructure (PKI) certificate validation. At this point validity of the task provider's certificate can be considered established, and then it may be validated that the private key which corresponds to the public key from the task provider's certificate was used to sign the task's secure hash.

In some embodiments, other signature validation schemas (for example, those used in the simple public key infrastructure (SPKI)/simple distributed security infrastructure (SDSI) or the "web of trust" used in pretty good privacy (PGP)) may be used.

Moreover, in some embodiments, the supervisor 160 may additionally perform certificate revocation list (CRL) validation to ensure that all certificates involved in the signature validation are still valid. CRL can be obtained, for example, by means of a request to a server that hosts the CRLs. This request can be made, for example, via the operating system 111 and the communications port 118 of the non-secure zone 152.

Further, in some embodiments, the Online Certificate Status Protocol (OCSP) may be used to check certificate validity (instead of or in addition to CRL validation).

At block 220, the supervisor 160 may clear (for example, fill with zeros) the task memory. In some embodiments, the task memory may include task data memory and/or task instruction memory. This may be performed to prevent old code, old data, or both, from affecting the task currently being loaded, and to avoid information leaks between different tasks.

At block 225, permissions that form a part of the task may be saved. For example, the supervisor 160 may save the permissions associated with the task. These saved permissions may be enforced while the task is running, as described herein.

At block 230, the method 200 may load the task code and task data and initiate execution of the task code. For example, the supervisor 160 may load the received task into the task memory. In some embodiments, the task memory may be separated into the instruction memory and data memory. Thus, the supervisor 160 may store task code in the task instruction memory and any received task data in the task data memory, and may initiate execution of the received code.

At optional block 232, the method 200 may report that the task has been loaded successfully. For example, if the supervisor 160 successfully initiated the task execution, the supervisor 160 may report that the task has been loaded successfully. The report may be, for example, a message sent by the supervisor 160 to the administrator's task 175, that had previously requested that the task be loaded. This information may be forwarded to a system administrator to report the state of the system 100. In some embodiments, this information also may be used for system restoration in case of a system reboot (e.g., after a system failure) for the system 100.

Then the method 200 may proceed to block 235, at which, the supervisor 160 may begin waiting for one or more external events or events related to the task execution. For example, at transition 240, a request from the task may be received. For example, the task may send a request to the supervisor, via task interface 172, to listen for and to accept incoming secure connections. Exemplary secure connections may include SSL/TLS connections over TCP or over UDP, SSH connections over TCP or over UDP, and so on. At block 241, permissions for the request may be checked. For example, the supervisor 160 may verify that such a request is permitted for execution according to permissions saved at block 225. If such a check is passed successfully, then, at block 243, the supervisor 160 may process the request. For example, in the above example, the supervisor 160 may start to listen for connection request(s) from any client on behalf of the task. Once the request from the task is processed, the method 200 may return to block 235 from block 243.

At block 235, another transition 245 may also occur because of an external event. For example, a data storage may confirm that a data saving operation has been completed successfully. The data storage may be any data storage for the system 100. For example, the data storage may be the data storage 119 and accessed by the task 170 via a corresponding task interface 172, supervisor 160, bus 151 and/or the NS system 152. The data storage may also be another data storage (not shown) that may be controlled directly by the supervisor 160. In another example, the supervisor 160 may listen for incoming connections on behalf of the task, may receive SSL/TLS packets that successfully conclude a SSL/TLS handshake, and may need to inform the task that a secure client connection has been accepted. When a connection request from a client arrives, for example, the supervisor 160 may accept it on behalf of the task to establish a secure connection with the client and to pass that connection to the task at block 247. In some embodiments, such listening and accepting of a TCP connection may be implemented within the NS System 152 while any encryption logic (such as SSL/TLS handshake) may be handled within the supervisor 160, such that any keys used for secure connection purposes are not exposed outside of the supervisor 160.

If the task finishes execution, at transition 253, a notification may be sent to the supervisor 160 notifying it that the task execution has finished, and the supervisor 160 may terminate the task and perform certain clean up steps. Then, at block 255, a cleanup may be performed. For example, the supervisor 160 may clear the task instruction and data memory for the task. In addition, the supervisor 160 may send a message to the administrator's task 175 notifying it that the task has been terminated. Such message may, for example, additionally contain a reason for termination (such as "completed," "abnormally terminated," etc). This information may then be forwarded by the administrator's task 175 to a system administrator for monitoring the state of the system.

It should be noted in some embodiments, that both a task 170 and the administrator's task 175 may be loaded, executed and terminated using the method 200 as described above. The administrator's task 175 may additionally have the following features. For example, the administrator's task 175 may be loaded at the system start for the system 100. Accordingly, at block 205, instead of receiving a command to load a task, the supervisor 160 may start loading the administrator's task 175 from a specified location, and the checksum (for example, secure hash such as SHA-1 or SHA-256) of the administrator's task 175 may be permanently stored in a non-volatile storage exclusively controlled by the supervisor 160. Exemplary storage for the checksum of the administrator's task 175 may be the key storage 167 or the certificate storage 166, or other non-volatile storage used by the supervisor 160. Moreover, at block 215, the supervisor 160 may additionally verify that the permissions of the administrator's task 175 contain an indication that this is an administrator's task. In addition, administrator's task 175 may have other permissions, for example, to request loading, and in some embodiments, configuring and/or terminating tasks. In some embodiments, these other permissions may be derived from the "administrator's task" permission described herein.

In some embodiments, the administrator's task 175 may implement logic to receive and/or maintain information about tasks that should be run on a system boot. Such information, for example, may be maintained and modifiable by a system administrator. In some embodiments, based on this information, the administrator's task 175 may generate and permanently save information about the system configuration (for example, a list of tasks that should be run on a system boot).

In addition to executing tasks as described above, some embodiments of the present disclosure may also allow executing subtasks. Subtasks are similar to tasks in that they also may have their own task code, task data, one or more certificates, and a set of permissions that may or may not coincide with the set of permissions of the calling task. Subtasks may be executed in the context of a calling task or a calling subtask, and in some embodiments may not be allowed to access the memory allocated to the calling task or calling subtask except a memory block that is specifically intended to be shared between the subtask and the calling tasks/subtask. In addition, when a subtask is executed, the execution of a calling task (or calling subtask) may be suspended, and resumed when the execution of the subtask is terminated. In some embodiments, subtasks may be implemented as described in the '687 application, and/or include "indirect subtasks" as described in U.S. Provisional Patent Application No. 61/789,618, entitled "Systems, Methods and Apparatuses for Securely Storing and Providing Payment Information," and filed on Mar. 15, 2013 (the '618 application), the content of which is incorporated herein by reference in its entirety.

Specific types of tasks in the system 100 may include various tasks such as secure email processing tasks, media content distributing tasks, payment processing tasks, and so on.

Figure 2B:
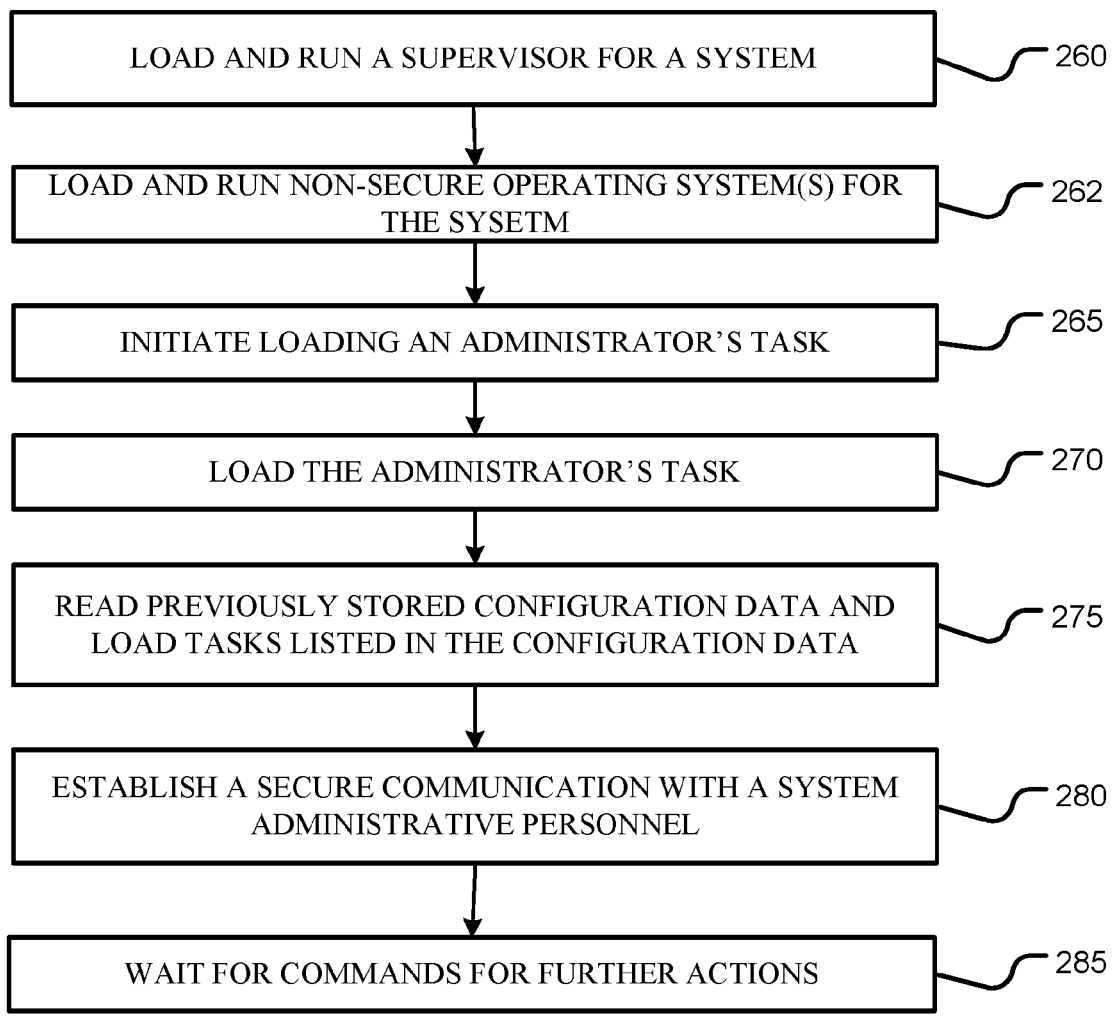
FIG. 2B is a flow diagram illustrating an exemplary start up method according to the current disclosure.

FIG. 2B shows an exemplary system start up process 258 according to the present disclosure. At block 260, the supervisor 160 may be loaded and run for the system 100. And at block 262, the software in the NS system 152 (for example, the OS 111) may be loaded and run. At block 265, the supervisor 160 may initiate loading an administrator's task 175. In one embodiment, such a task 175 may be stored in a secure storage exclusively accessed by the supervisor 160. The secure storage may be the key storage 167, the certificate storage 166, or other non-volatile storage used by the supervisor 160. In some embodiments, only a checksum of the administrator's task may be securely stored, and accessed exclusively by the supervisor 160. In such embodiments, the task code binaries may be received from a non-secure source (e.g., the NS system 152 may read the binaries from the storage 119 and forward it through the bus 151 to the supervisor 160) and the supervisor 160 may only verify that the hash or checksum of the received task matches the hash or checksum stored in the key storage 167.

At block 270, the supervisor 160 may load the administrator's task 175. For example, the administrator's task may be loaded by the supervisor 160 as discussed above with respect to FIG. 2A. Then, at block 275, the administrator's task 175 may read previously stored system configuration data and request the supervisor 160 to run tasks listed in the configuration data. In some embodiments, configuration data may be stored in a secure storage exclusively accessible by the supervisor 160 while in other embodiments only a checksum (or secure hash) of the configuration data may be stored in a secure storage exclusively accessible to the supervisor 160.

At block 280, a secure communication with a system administrator may be established. In some embodiments, the system administrator may communicate with the system 100 using a user interface (UI) device(s) of the system 100. The administrator's task 175 may assume control of the UI device such that any input from the UI device or output to the UI device may not be intercepted by the NS system 152. An exemplary implementation of taking control by a task executing in a secure computing environment is described herein.

In some other embodiments, the system administrator may use a separate computing device (e.g., the system administrator's device 136) to connect to the system 100, but the computing device is not part of the system 100 and not controlled by the system 100. In these embodiments, to convey input from a system administrator to the administrator's task 175 (and output from the administrator's task 175 to the system administrator), instead of using UI device(s) of the system 100, a secure connection (such as SSL/TLS connection, SSH connection, or any other similar connection) between the administrator's task 175 and the separate computing device used by the administrator may be used. Therefore, in some embodiments, the system 100 may be implemented without UI devices at all. In such embodiments, a client administrative task may be implemented on the separate computer to process the system administrator's input and/or output and to communicate with the administrator's task 175 running on the system 100. In one embodiment, the separate computing device may be implemented as a computing device described in the '724 application or the '774 application.

To ensure that the connection is established with an intended administrator's device, in some embodiments the administrator's task 175 may contain, for example, a list of certificates (or public keys) that correspond to legitimate administrator's devices. Then, the administrator's device may be verified by ensuring that it contains a private key corresponding to a public key stored, for instance, within the task data of the administrator's task 175. Additionally, in some embodiments, the separate computing device used by the administrator may communicate a hash of the task currently running on it to the supervisor 160, which may check the hash against a list of hashes of valid client administrative tasks. Alternatively, using a method described in the '326 application the content of which is incorporated herein by reference in its entirety, the supervisor 160 may first ensure that the communication is established with one of legitimate secure devices, and/or that a valid client administrative task is running on the separate computing device.

In some embodiments using a separate computing device, the separate computing device (or "client administrative task" running on the separate computing device) may establish a secure connection not to the administrator's task 175 as described herein, but directly to the supervisor 160.

Then, at block 285, the supervisor 160 may start waiting for commands for further actions. For example, commands, such as commands to load or terminate certain tasks, may be received from the administrator's task 175 via the administrator's task interface 177.

Figure 3A:
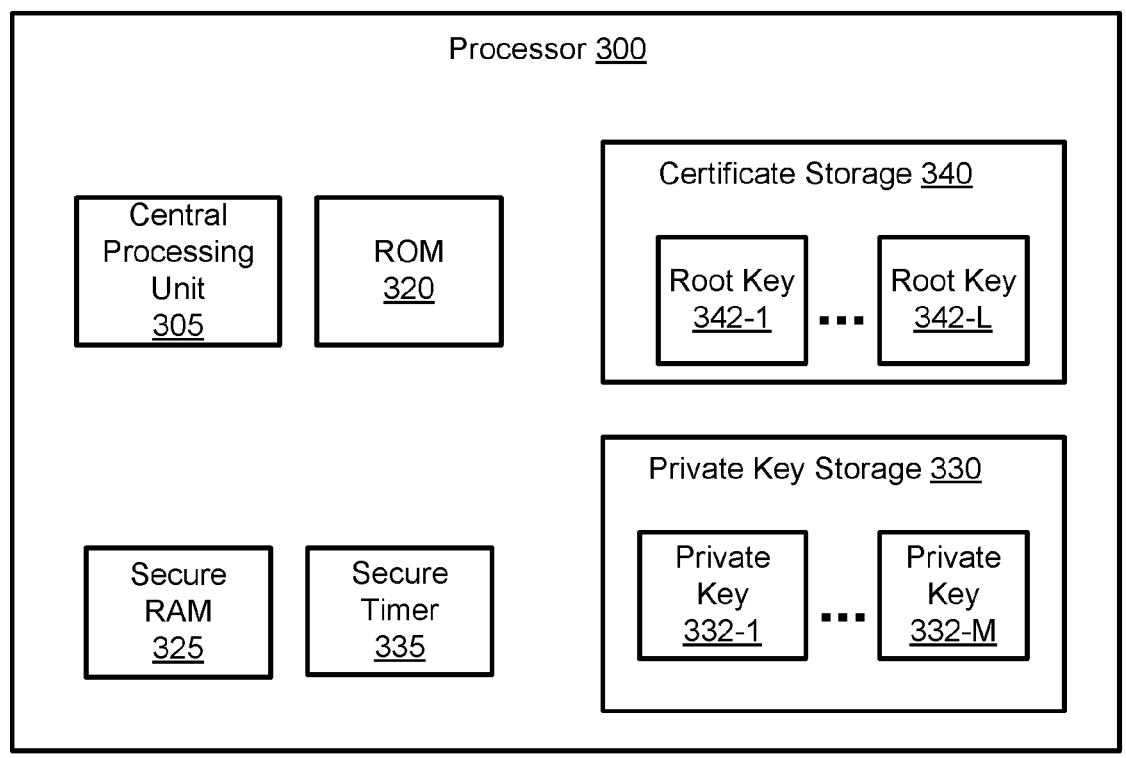
FIG. 3A is a block diagram of an exemplary system according to the present disclosure.

In one or more embodiments, the NS system 152, supervisor 160 and each task 170, 175 may be implemented in separate virtual machines (VMs) executed on a computer processor. FIG. 3A is a block diagram of an exemplary processor 300 according to the present disclosure. The processor 300 may comprise a central processing unit (CPU) 305, a read-only memory (ROM) 320, a secure random access memory (secure RAM) 325, a private key storage 330, a secure hardware timer 335, and a certificate storage 340. It should be understood that the CPU 305, ROM 320, secure RAM 325, private key storage 330, secure hardware timer 335, and certificate storage 340 may be physical or logical components of the processor 300. These components of the processor 300 may be fabricated on a single silicon chip or on multiple chips operatively connected together. The processor 300 may have a single physical casing that encloses all its components. In one or more embodiments, the processor 300 may be tamper-resistant and/or may use tamper detection techniques.

The CPU 305 may perform operations normally performed by a computer CPU that can run one or more VMs. In some embodiments, the VMs may be implemented in software (for example, using the known paravirtualization technique) and the CPU 305 does not need to provide any hardware support. In other embodiments, the CPU 305 may be a computer processor that supports VMs at the hardware level (e.g., by implementing hardware virtualization techniques known in the art and/or new techniques to be developed in the future), such as Intel VT-X®, AMD-V®, or ARM virtualization. Each of the VMs may independently execute instructions as if the virtual machine (VM) runs on a computer processor exclusive to itself. For example, each virtual machine may have software running on it, such as, an OS (like Windows, Linux, etc.) with applications, or pieces of software (e.g., some tasks or subtasks) requiring no operating system at all.

Figure 3B:
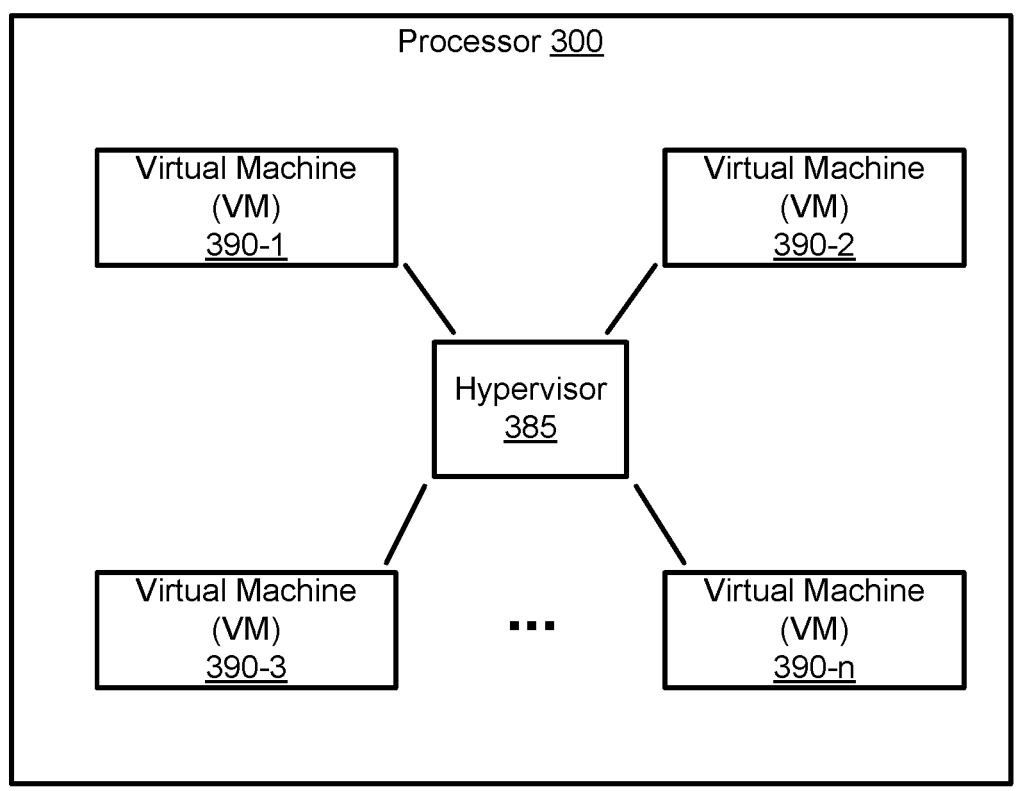
FIG. 3B is a block diagram of an exemplary system in operation according to the present disclosure.

FIG. 3B is a block diagram showing the exemplary processor 300 in operation according to the present disclosure. The logical structure of the entities running on the CPU 305 is shown on FIG. 3B while other components of the processor 300 may be skipped for simplicity. As shown in FIG. 3B, a plurality of VMs 390-1 through 390-$n$ ($n$ being any positive integer) may be executing on the processor 300 and the plurality of VMs 390 may be controlled by a hypervisor 385 also executed by the CPU 305. The hypervisor 385 may schedule VMs 390 to run and enforce rules related to VM access rights to resources (such as peripheral devices, memory blocks, etc). For example, access to the physical memory may be organized such that software running on one of the VMs will not be able to access memory used by another VM (e.g., allocated to another VM). In some embodiments, the supervisor 160 may be implemented as one VM and each of the tasks 170 and 175 may be executed as separate VMs as will be described below.

In one or more embodiments, the CPU 305 may also perform the functionalities such as image processing and/or cryptography.

The ROM 320 may be a non-volatile memory and may be configured such that data stored in the ROM 320 may not be accessed and/or modified from outside the processor 300. In one embodiment, the ROM 320 may be fully implemented in hardware to be enclosed within the processor 300. In another embodiment, the ROM 320 may be implemented as a non-volatile storage external to the processor 300. If implemented as an external storage, the data stored on the ROM may be encrypted and/or authenticated, and the processor 300 may store an encryption key to decrypt and/or authenticate data loaded from the external storage. An exemplary secure non-volatile storage is described in the '388 application. In some embodiments, the ROM 320 may be implemented as a re-programmable ROM, such as a PROM, EPROM, EEPROM, flash memory, etc.

The secure RAM 325 may store data that cannot be accessed and/or modified from outside the processor 300. In some embodiments, the secure RAM 325 may be implemented as a separate memory inside the processor 300. In other embodiments, the secure RAM 325 may be allocated from an existing random access memory already present inside the processor 300 (e.g., an existing L2 or L3 cache). In the latter case, the segment of cache allocated as the secure RAM 325 may be marked as "locked," that is, the data stored in it should not be exposed outside the processor 300. For example, if the CPU cache is a write-back cache, "locked" may be implemented by permanently marking the cache lines allocated for the secure RAM 325 with two flags: one is the usual "dirty" flag, another is a special "locked" flag (which may indicate that such a "locked" cache line should never be written to an external main RAM). In some embodiment, the "locked" flag may imply the "dirty" flag.

The private key storage 330 may be an exemplary implementation of the key storage 167 and may be used for storing one or more unique private keys labeled 332-1 through 332-M (M being a positive integer). In some embodiments, the key storage 330 may be implemented as a separate hardware unit inside the processor 300. In some other embodiments, the key storage 330 may be a part of the ROM 320. In embodiments in which the ROM 320 may be implemented as an external non-volatile storage, the keys stored thereon may be additionally encrypted. If the storage 330 is a separate hardware unit inside the processor 300, in one or more embodiments, the content of the storage may be initialized at the time when the processor 300 is manufactured.

The timer 335 may be implemented so that it cannot be manipulated from outside the processor 300 (but, in some embodiments, time values might be accessible from outside the processor 300 thus implementing read-only access). An exemplary secure timer is described in the '248 application.

The certificate storage 340 may be an exemplary implementation of the certificate storage 166 and may store one or more certificate chain root keys labeled 342-1 through 342-L (L being a positive integer). In one embodiment, the values of such keys may be stored within the processor 300 at the time when the processor 300 is manufactured. The content of this certificate storage 340 may be protected from modifications from outside the processor 300. In some embodiments, the root keys may be kept unmodified during the lifetime of the processor 300. In one of such embodiments, the certificate storage 340 may be, for example, a part of the ROM 320.

In other embodiments, it may be advantageous to periodically update some of such keys. In such embodiments, the certificate storage 340 may be implemented, for example, as an on-chip non-volatile storage having enough storage for multiple sets of root keys for the processor 300 to switch between different sets of root keys. Exemplary on-chip non-volatile storage may include any kind of PROM including, but not limiting to, EEPROM and EPROM, or battery-powered static RAM. An exemplary implementation of secure replacement of root certificates within electronic devices is described in U.S. Provisional Patent Application No. 61/663,266, entitled "Systems, Methods and Apparatuses for Securing Root Certificates," and filed on Jun. 22, 2012, the entirety of which is incorporated herein by reference.

In one embodiment, for example, two sets of root keys may be stored by an embodiment of the processor 300. If five root keys are used for normal operations, for example, the non-volatile storage may have room for storing 10 keys. In addition, the non-volatile storage may contain a one-bit switch to indicate which keyset is currently in use. An exemplary process of updating the root keys may be implemented as follows. At a first stage, the first keyset may contain a set of valid keys in use and the one-bit switch may indicate that the first keyset is in use. Then at a second stage, a key replacement procedure may be processed by the processor 300 to fill a second keyset with a new set of root keys. At the second stage, the one-bit switch may still point to the first keyset and thus, if for any reason processing of the key replacement procedure is not completed, the processor 300 may still function properly using the first keyset and the command may be re-applied if necessary. If the key replacement procedure is completed successfully, the second keyset may have a valid set of root keys. Then at a third stage, the processor 300 may start using the second keyset and the one-bit switch may be changed to indicate that the second keyset is in use.

As described above, the ROM 320 may be implemented as an updatable secure external non-volatile storage and thus, in some embodiments, the certificate storage 340 may be implemented as a part of the ROM 320 in the updatable secure external non-volatile storage. In one such embodiment, the root keys may be updatable as well. For example, initially, a first secure external non-volatile storage (e.g., EPROM #1) may store a set of valid keys, which may be encrypted with a symmetric key stored within the processor 300. Then, a certificate replacement message to replace the root key may be received and processed by the processor 300. In processing the certificate replacement message, a second secure external non-volatile storage (e.g., EPROM #2) may be prepared to store a new set of root keys. In some embodiments, this new set of root keys may be encrypted with a new symmetric key by the processor 300 and new symmetric key may be stored within the processor 300. In the meantime, the symmetric key used to encrypt the root keys stored in the first non-volatile storage may still be stored within the processor 300. Thus, if for any reason processing of the certificate replacement message is not completed, the processor 300 may still restart with the symmetric key used to encrypt the root keys stored in the first non-volatile storage and the key replacement procedure may be re-applied if necessary. After the second non-volatile storage is prepared successfully and its validity is verified, the symmetric key stored within the processor 300 may be changed to the new symmetric key (the one used for encrypting the root keys on the second non-volatile storage).

Figure 3C:
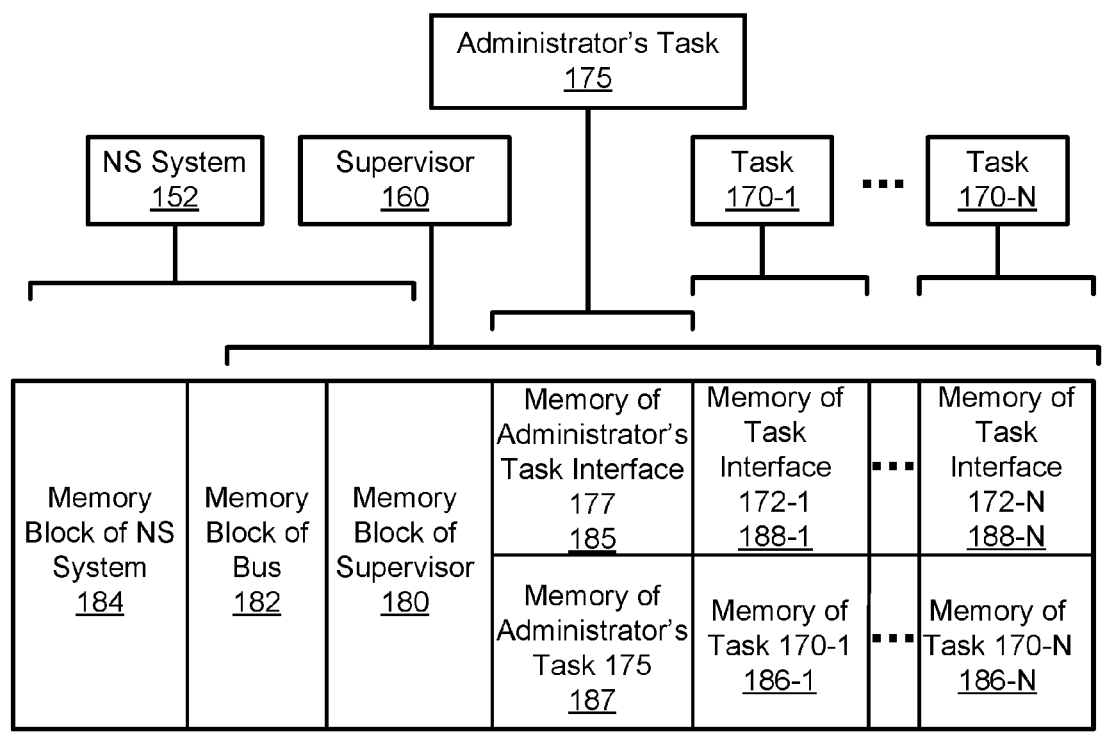
FIG. 3C is a block diagram of an exemplary memory allocation according to the present disclosure.

FIG. 3C illustrate how a physical memory may be distributed among various components of the system 100. As shown in FIG. 3C, the supervisor 160, NS system 152, and tasks 170 may each use certain memory segments. A memory block 180 may be used exclusively by the supervisor 160 for its operations. A memory block of bus 182 may be allocated for data sharing between the supervisor 160 and the NS system 152, and may be used/accessed by both the supervisor 160 and the NS System 152. A memory block of NS system 184 may be used by the NS system 152 for its own operations. In some embodiments, the supervisor 160 may also have direct access to the memory block 184.

Each task 170-1 through 170-N may have a separate memory block 186-1 through 186-N, respectively, and such memory blocks may be accessed and used by a corresponding task and by the supervisor 160. A separate memory block (labeled 188-1 through 188-N) may be allocated for the task interfaces 172-1 through 172-N respectively. Such memory blocks may be used/accessed by both a respective task 170 and the supervisor 160 for data sharing. In addition, a memory block 187 may be allocated to the administrator's task 175 and a memory block 185 may be allocated to the administrator's task interface 177. It should be noted that the term memory block used herein may represent contiguous and/or noncontiguous segments of the physical memory of the system 100.

In some embodiments, some memory blocks, for example, the memory blocks 180 and/or 186, may be separated into instruction memory and data memory.

Figure 5:
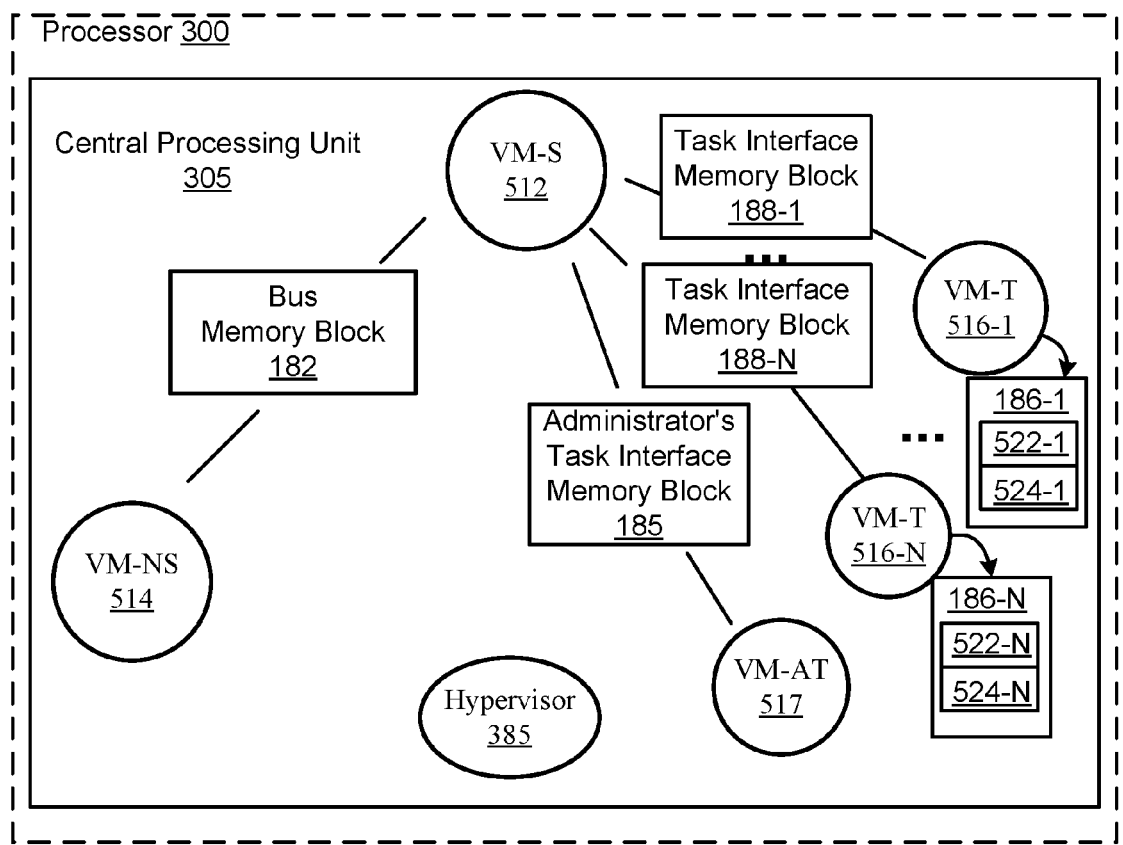
FIG. 5 is a block diagram showing an exemplary embodiment according to the present disclosure.

FIG. 4 shows an exemplary mapping of some of components on FIG. 1A to components of the CPU 305. As shown in FIG. 4, the supervisor 160 of FIG. 1A may be implemented as a virtual machine VM-S 512, the non-secure system 152 (with an ordinary operating system and applications running thereon) may be implemented as another VM (referred to as VM-NS 514), and the tasks 170-1 through 170-N may be executed in respective VMs VM-T 516-1 through VM-T 516-N. Further, a segment of physical memory may be allocated as the bus memory block 182 to implement the bus 151 between the supervisor 160 and non-secure system 152. Separate segments of physical memory may be allocated to be respective task interface memory block 188-1 through 188-N that may correspond to the task interfaces 172-1 through 172-N between the supervisor 160 and the tasks 170-1 through 170-N. Similarly, the administrator's task 175 may be implemented as a separate virtual machine VM-AT 517 and the administrator's task interface 177 between the supervisor 160 and the task 175 may be implemented as a separately allocated segments of physical memory referred to as the administrator's task interface memory block 185. FIG. 5 shows the various components of the system shown on FIG. 1A mapped to logical entities established on the CPU 305 in run time according to an embodiment of the present disclosure.

As shown in FIG. 5, the CPU 305 may also run a hypervisor 385 that may control the execution of the VMs and allocation of memory blocks. It should be noted that the hypervisor 385 may be implemented in hardware, software, or a combination of hardware and software. In particular, the hypervisor 385 may be implemented with hardware support of any virtual machine techniques, already known or available in the future.

The embodiment shown in FIG. 5 may have a single virtual machine VM-NS 514, which may run one non-secure operating system at a time. In some embodiments, however, there may be more than one VM-NS 514. Communication between the virtual machine VM-S 512 (implementing the supervisor 160) and the virtual machine VM-NS 514 may be done through the bus memory block 182. Communication between the virtual machine VM-S 512 and each of virtual machines VM-T 516-1 through 516-N may be done through the interfaces based on separate segments of physical memory, the task interface memory blocks 188-1 through 188-N, respectively. In embodiments where there are more than one VM-NS 514, there may be multiple memory blocks 182, for example, with one memory block 182 for each VM-NS 514.

Physical memory blocks 186-1 through 186-N allocated for each of VM-T 516-1 through 516-N may be divided into instruction memory blocks 522-1 through 522-N and data memory blocks 524-1 through 524-N respectively. That is, as shown in FIG. 5, each memory block 186 may be divided into an instruction memory block 522 and a data memory block 524. In some embodiments, the instruction memory block and the data memory block may be combined (for example, 522-1 and 524-1 may be combined, 522-2 and 524-2 may be combined and so on). In some embodiments, the memory block 187 allocated to the administrator's task 175 may also be divided into an instruction memory block and a data memory block.

It should be noted that in some embodiments, the memory of VM-S 514 and the memory of hypervisor 385 (as well as memory allowing for communication between them, if any), may be mapped to the secure RAM 325. Other memory blocks (such as memory of other virtual machines) may be mapped to ordinary RAM (and reside outside of the processor 300). It should be noted that, although not shown, the memory allocated to the VM-NS 514, VM-AT 517 and VM-S 512 may also be separated into instruction and data memory blocks. It should be noted that in some embodiments, the secure RAM 325 may be implemented over ordinary RAM (residing outside of the processor 300).

In some embodiments, the hypervisor 385 may control initial mapping of peripheral devices to one of the VMs. In one embodiment, the hypervisor 385 may be configured to only grant requests for re-mapping the peripheral devices if they come from the VM-S 512 (and not from any other VM). In some embodiments, the mapping may be supported at least in part by hardware level virtualization techniques, such as an input/output memory management unit (IOMMU). As an example, INTEL's implementation of IOMMU is known as Virtualization Technology for Directed I/O (VT-d).

It should be understood that there are a number of ways to implement communication via interfaces based on memory blocks 182 and 188. In one non-limiting exemplary embodiment, a virtual machine initiating communication (sending a request, calling API, etc) may load associated data to the memory block, and then send a notification to the hypervisor 385 indicating that it wants to communicate the data already loaded to the memory block to a respective virtual machine. For example, the VM-NS 514 may load associated data to the bus memory block 182, and then send a notification to the hypervisor 385 that it wants to communicate the data already loaded to the bus memory block 182 to VM-S 512. Then, the hypervisor 385 may forward this notification to the intended virtual machine (such as VM-S 512 in the current example). If necessary, the hypervisor 385 may additionally schedule the intended virtual machine (e.g., the VM-S 512) to process the request.

In addition, in some embodiments, the hypervisor 385 may re-map appropriate memory space and enforce a restriction that after such a request only the intended VM has access to the memory space. The notification to the hypervisor 385 may include a reference to the calling virtual machine (e.g., VM-NS 514) and/or to the memory block used for communication (e.g., bus memory block 182). The intended virtual machine (e.g., VM-S 512) may receive the notification from the hypervisor 385, read the corresponding memory buffer (e.g., bus memory block 182), and processes the call or request.

In another exemplary embodiment, to implement communication via the interfaces based on memory blocks, a virtual machine initiating communication may first load data relevant to the request to the memory block used for communication and then change a predefined area of memory within that memory block to indicate that a communication request is made. For example, the VM-NS 514 may initiate communication by loading data into the bus memory block 182 and make change to a counter value stored in a predefined area of the bus memory block 182. A virtual machine waiting for a notification (e.g. the VM-S 512) may periodically check for changes in that predefined area, and if changes are detected, the virtual machine may assume that a communication request has come and start processing the data related to the request. In some embodiments, to detect changes, the virtual machine waiting for communication requests may store an old value of the counter for comparison to a current value of the counter.

The exemplary processor 300 shown in FIG. 5 may have a hypervisor 385 and separate virtual machines VM-S 512, VM-NS 514, VM-T 516 and VM-AT 517 running on it. In some other embodiments the separation of components may be different. For example, the hypervisor 385 and the VM-S 512 may be combined so that functionalities of both of them may be performed by one hypervisor. In other words, a single hypervisor may implement both functionality of the hypervisor 385 (required to run virtual machines) and functionality of the supervisor 160. In these embodiments, the single hypervisor may use the secure RAM 525 for all operations, and the secure RAM 525 may not be mapped to any of the virtual machines.

In some other embodiments, the VM-S 512 and VM-T 516 may be combined in a single virtual machine so that the logic of the supervisor 160 and any tasks may be performed within the same virtual machine. In such embodiments, when a task is to be loaded, VM-S 512 may request the hypervisor 385 for the memory blocks 522, 524, and 188. Alternatively, the VM-S 512 may allocate some or all of such memory blocks from its own memory (e.g., some memory allocated for the VM itself), and each task may be loaded and executed as a separate process run by a secure operating system running within the VM-S 512 (with the secure operating system implementing the supervisor's logic).

Figure 6:
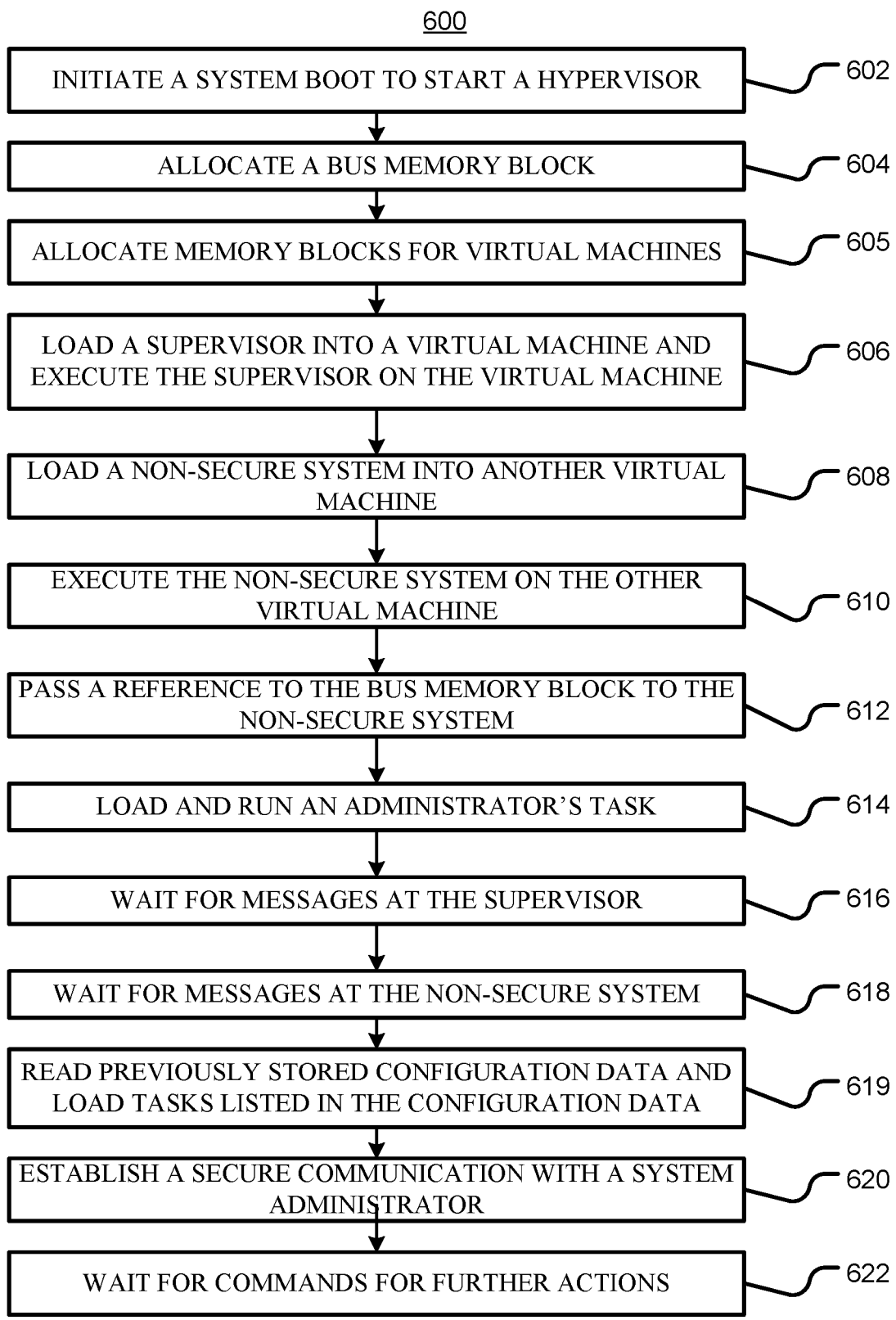
FIG. 6 is a flow diagram showing an exemplary process of system start according to the present disclosure.

FIG. 6 is a flow diagram showing an exemplary process 600 of initializing an exemplary processor according to the present disclosure. The exemplary process 600 may illustrate in detail how the VMs and the memory blocks of the exemplary processor 300 may be initialized and controlled. At block 602, the exemplary processor 300 may be powered on to initiate a system boot that may start the hypervisor 385. As described above, the hypervisor 385 may be a virtual machine manager that creates and runs virtual machines. In some embodiments, the hypervisor 385 may be loaded from the ROM 320. At block 604, the hypervisor 385 may allocate a block of memory as the bus 151 between the supervisor 160 and non-secure system 152. For example, as shown in FIG. 5, the bus memory block 182 may be allocated to serve as a communication buffer between the virtual machines VM-S 512 and VM-NS 514.

At block 605, the hypervisor 385 may allocate blocks of memory for the virtual machines. For example, the hypervisor 385 may allocate one block of memory for VM-S 512 and another block of memory for VM-NS 514. Then, at block 606, the hypervisor 385 may load the supervisor 160 into a virtual machine VM-S 512 and start executing the VM-S 512 ("start executing" virtual machine may be implemented as starting scheduling for VM-S 512). In some embodiments, a reference to the bus memory block 182 may be provided to the supervisor 160. The supervisor 160 may be loaded to the secure RAM 325 from an image of the supervisor 160. The image of the supervisor 160 may be stored in the ROM 320, a hard disk drive or another non-volatile storage. The hypervisor 385 may optionally perform an integrity check of the loaded supervisor (for example, comparing a hash of the loaded image with a pre-defined hash stored in ROM 320) before executing it.

At block 608, an image of non-secure system may be loaded into another virtual machine. For example, the hypervisor 385 may load the image of the non-secure system 152 into the VM-NS 514. In some embodiments, the non-secure system 152 may be loaded from a pre-defined location on a hard disk drive. The non-secure system 152 may comprise an ordinary operating system 111 (such as Linux, Windows, etc) or specialized software, and may provide various services, such as network communications, operations with local storage, and access to local peripheral devices, etc. In some embodiments, the OS 111 may have a special driver for operations with the bus memory block 182.

At block 610, the non-secure system may start execution. For example, the hypervisor 385 may start executing VM-NS 514. In some embodiments, the VM-NS 514 may send requests to the VM-S 512 through the interface based on the bus memory block 182 during execution.

At block 612, a reference to the bus memory block may be passed to the non-secure system. For example, the OS 111 running within VM-NS 514 may implement a driver responsible for communications based on the bus memory block 182. This driver may obtain from the hypervisor 385 a reference to the bus memory block 182, and may use it to allow the OS 111 running inside the VM-NS 514 to send/receive commands and/or other information over the bus memory block 182.

At block 614, an administrator's task may be loaded and run. For example, the VM-S 512 may send a request to the hypervisor 385 to run a virtual machine VM-AT 517 for the administrator's task 175. In some embodiments, the data (task code, task data, permissions, etc.) of the administrator's task 175 may be loaded from a predefined location within the secure ROM 320. In some other embodiments, the data of the administrator's task 175 may be loaded from a hard disk drive or another non-volatile storage, with the supervisor 160 optionally performing an integrity check of the data of the administrator's task 175 (for example, comparing a hash of the loaded image with a pre-defined hash stored in ROM 320) before executing it. Details of task loading will be discussed with respect to FIG. 7 below.

At block 616, the supervisor 160 running within the VM-S 512 may start waiting for messages. For example, messages may be received through the interface based on the bus memory block 182. Such messages may include, for example, requests to set up a communication channel with a task running inside one of the virtual machines (e.g., one of VM-T 516), or with the administrator's task running inside the virtual machine VM-AT 517.

At block 618, the NS system 152 that runs within the VM-NS 514 may start waiting for messages. For example, as described above, the NS system 152 may run an operating system 111 with one or more applications 112 to provide certain services to the supervisor 160 and/or to tasks 170. The operating system 111 or one of the applications 112 may be configured to listen to messages from the supervisor 160. The messages may be commands sent via the interface based on the bus memory block 182 or requests coming externally. In some embodiments, some requests coming externally may be intended for the VM-S 512 and thus may be forwarded (with or without intermediate processing) by the application 112 running on NS system 152 that runs within the VM-NS 514 to the VM-S 512 (e.g., via the interface based on the bus memory block 182).

At block 619, the administrator's task 175 running within the VM-AT 517 may attempt to read and restore previously stored system configuration as it has been described in more details with respect to the block 275.

Then at block 620, a secure communication with a system administrator may be established similar to that described with respect to block 280 of FIG. 2B. At block 622, the supervisor 160 may start waiting for commands for further actions similar to that described with respect to block 285 of FIG. 2B. Although in the process 600, various components of the system 100 including the supervisor 160 may be implemented to execute on virtual machines, the description of the blocks 280 and 285 is equally applicable to the blocks 620 and 622.

Figure 7:
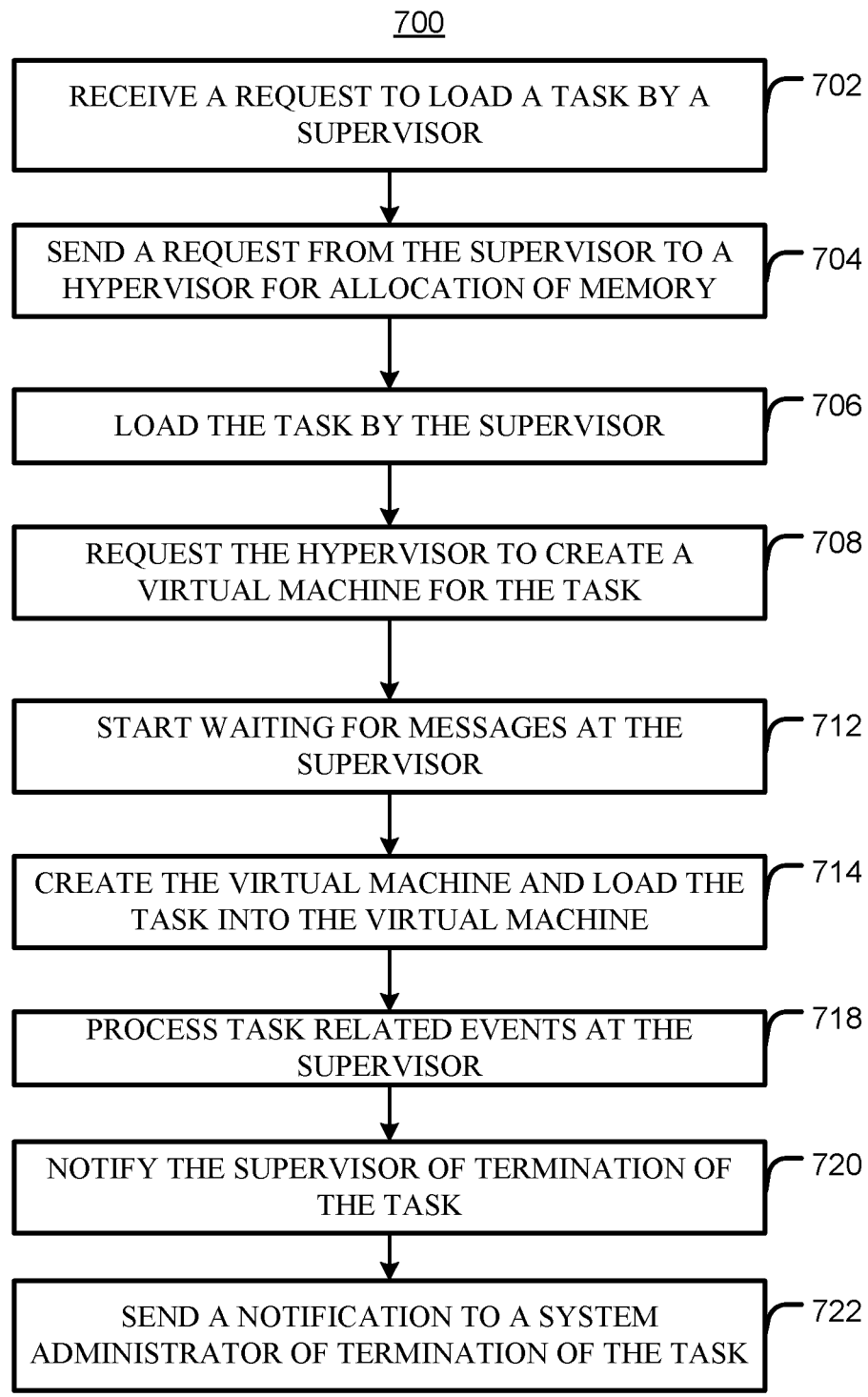
FIG. 7 is a flow diagram showing an exemplary process of executing a task using an exemplary processor according to the present disclosure.

FIG. 7 illustrates an exemplary process 700 of executing a task using the exemplary processor 300 according to the present disclosure. The process 700 may start at block 702, at which a request to load and execute a task may be received by the supervisor 160. In some embodiments, such a request may include one or more blocks of data sent over the bus memory block 182 to the VM-S 512. Then at block 704, a request may be sent from the virtual machine VM-S 512 to the hypervisor 385 for allocation of memory blocks that are needed for executing a task. In some embodiments, the memory blocks needed may include an instruction memory block 522, a data memory block 524, and a task interface memory block 188. In some embodiments, these memory blocks may be allocated as a single contiguous memory block. At block 706, the supervisor 160 running at the virtual machine VM-S 512 may load the task and prepare to execute it. In one embodiment, as described above with respect to FIG. 2A, in preparing to execute the task, the VM-S 512 may decrypt the task (if applicable), verify the task signatures, clean the memory blocks 188, 522, and 524 (for example, by zeroing them), and load the task code to the instruction memory block 522 and task data to the data memory block 524.

At block 708, the VM-S 512 may send a request to the hypervisor 385 to create a virtual machine VM-T 516 for the task. For example, the virtual machine VM-S 512 may request the hypervisor 385 to create a virtual machine VM-T 516, to run the VM, and to provide appropriate notifications about the operation of the VM-T 516 to the supervisor VM-S 512. The virtual machine may be created, for example, with the image residing in the memory blocks 522 and 524, and using the memory block 188 as a buffer for implementing the task interface 172. In some embodiments, this request may include a virtual address where the memory block 188 may be mapped within the newly created VM.

At block 712, the supervisor 160 may wait for task related events. For example, the VM-S 512 may wait for requests coming through the bus memory block 182 and task interface memory block 188 from VM-NS 514 and VM-T 516 respectively.

At block 714, the process 700 may create the virtual machine VM-T 516 and run the VM-T 516. As described above, the VM-T 516 may be created using code and data from the memory blocks 522 and 524. In some embodiments, the virtual machine VM-T 516 may have permissions to access only the memory blocks 522, 524, and 188 to execute the task. In one non-limiting embodiment, permissions granted to the VM-T 516 to access memory blocks 188 and 524 may disallow code execution (that is, the code can be executed only if it is located in the instruction memory block 522, which may be implemented, for example, using the XD bit on INTEL® x86 CPUs, Enhanced Virus Protection on AMD® CPUs, or XN bit on ARM® CPUs) to ensure code and data separation. In addition, in some embodiments, as a part of block 714, the hypervisor 385 may assign an identifier to the newly created virtual machine VM-T 516 and return the identifier to the supervisor 160 running in the VM-S 512. The supervisor 160 may pass the identifier of the VM-T 516 back to a system administrator (e.g., via the administrator's task 175).

At block 718, the supervisor 160 on the VM-S 512 may process task related events. For example, once the task is loaded into the virtual machine VM-T 516 and start executing, the supervisor 160 may wait for task related events. The task related events may include, for example, Application Programming Interface (API) calls from the task being executed. Such API calls may result in a message being sent over task interface 172, which may be implemented by the task interface memory block 188. While processing such messages, the supervisor 160 running in the VM-S 512 may send requests to a VM-NS 514 (which may have been created, for example, at the system start as described with respect to block 608 of FIG. 6).

At this stage in the process 700, the task executing in the VM-T 516 may continue to execute until being terminated. The task may be terminated for any number of different reasons. For example, the task may complete its execution and the VM-T 516 may terminate after the task completes the execution (regular termination), or there may be an error (such as a CPU exception) during the execution of the task and the VM-T 516 may have an abnormal termination, or the VM-T 516 may be forced to shut down by an external source. The external source may be, for example, a request from the administrator's task 175 running inside the VM-AT 517 sent to the supervisor 160. The administrator's task 175 may send such a command based on communication with the system administrator. The forced shut down may include a termination command that enables the task and the virtual machine VM-T to shut down in a graceful manner, or may include a command to perform an unconditional termination (e.g., by the hypervisor 385 destroying VM-T 516).

If the task needs to be terminated by a request coming from an external source, it may be handled, for example, via (a) sending a request to terminate to the task, (b) waiting for a pre-defined time (such as 5 seconds), (c) if the task is not terminated during the pre-defined time, requesting the hypervisor 385 to destroy the appropriate VM-T 516.

At block 720, the supervisor 160 on the VM-S 512 may be notified about the termination of the virtual machine VM-T 516 that executes the task. In some embodiments, the notification may contain the reason for the termination (for example, by providing an exit code, error code, or exception code). Moreover, the hypervisor 385 may clean the memory blocks 522 and 524. Alternatively, the hypervisor 385 may map such blocks to the VM-S 512 so that the VM-S 512 may perform such clean up after it receives the notification about termination of the VM-T 516. The memory may be cleaned, for example, by zeroing it.

At block 722, the supervisor 160 may notify a system administrator through the administrator's task 175 running in the virtual machine VM-AT 517 that the task has been terminated. Such notification may contain, for example, a reason for termination (such as, on demand, as a regular termination, or an error code).

Figure 8:
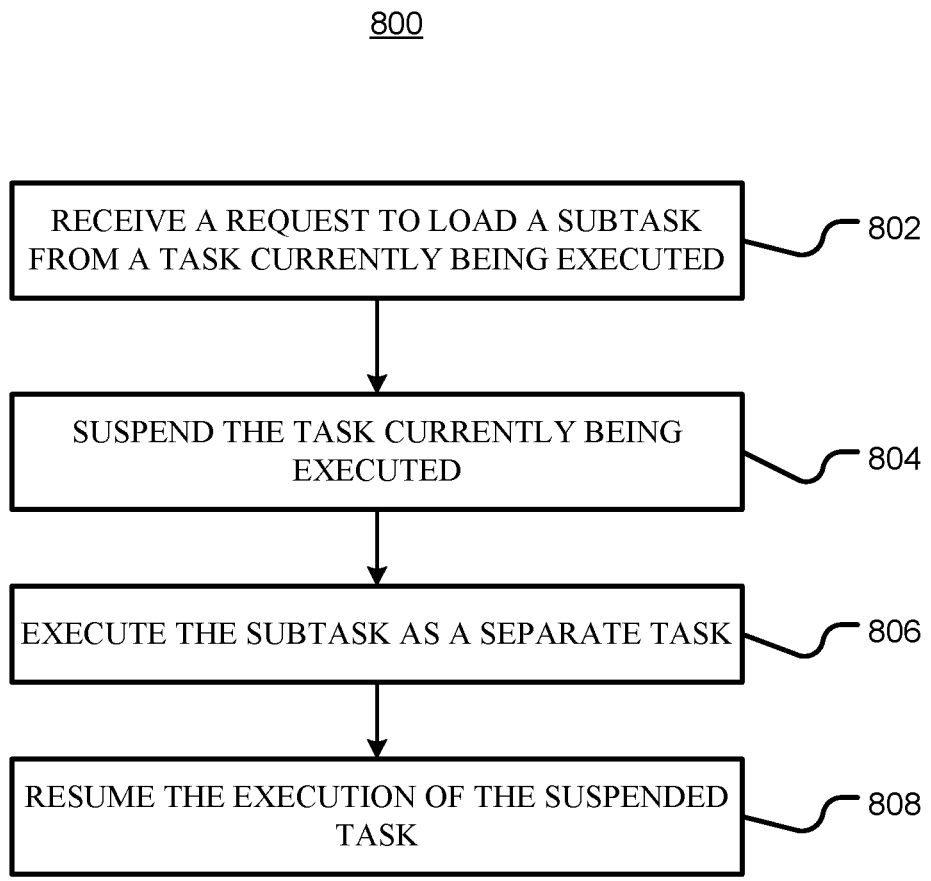
FIG. 8 is a flow diagram showing an exemplary process of executing a subtask using an exemplary processor according to the present disclosure.

In addition to executing tasks as described above, embodiments of the present disclosure may also execute subtasks, for example, as described in the '687 application. In addition, indirect subtasks, such as an ICC indirect subtask described in the '618 application, may also be executed by embodiments of the present disclosure. In general, the subtasks may have different permissions and in some embodiments may not be able to access the memory of the calling task (except a memory block specially intended as shared). Also, the calling task may be suspended when the called subtask is executed. In some embodiments, in which a task may be executed in a separate virtual machine as described above, to enforce the required memory separation, a subtask may be executed in its own virtual machine as if it were a separate task. FIG. 8 is a flow diagram showing an exemplary process 800 of executing a subtask using an exemplary processor according to the present disclosure. The process 800 may start at block 802, at which the supervisor 160 running on the virtual machine VM-S 512 may receive a request from a task running on the virtual machine VM-T 516 to load a subtask (for example, via the task interface 172 based on the task interface memory block 188). The request may contain the subtask to be executed (or, alternatively, an identifier of the subtask which is already known to the supervisor, for example, as a part of the task loading process) and the reference to a memory block to be used for data shared between the task and the subtask (such memory block may be implemented similar to the memory block used for the task interface memory block 188).

The process 800 may proceed to block 804, at which the task (running on the VM-T 516) may be suspended (for example, VM-T 516 may not receive further time slices from the hypervisor until it is resumed in block 808). Then at block 806, the subtask may be executed as a separate task. In some embodiments, the processor 300 may treat the subtask as a regular separate task and may execute the exemplary process 700 in its entirety (or in substantial part) at block 806. For example, another virtual machine may be initialized, the subtask may be verified and loaded into the newly created virtual machine, executed, and terminated as described above with respect to blocks 702-722. In one embodiment, the memory block to be used for data sharing may also be mapped to this newly created virtual machine. It should be noted that in some embodiments subtasks may have subtask permissions (for example, as mentioned in the subtask certificate) different from the task permissions, and in this case the subtask permissions may be enforced while the subtask is running. In some cases, the subtask permissions may be narrower than task permissions, and in some other cases, the subtask permissions may be broader than task permissions.

When the execution of the subtask is terminated, at block 808, the execution of the suspended task in the VM-T 516 may be resumed.

The exemplary process 800 illustrates an embodiment in which the supervisor 160 and a task may be executed in separate virtual machines. In another embodiment (for example, if the supervisor and task are running in the same virtual machine), to enforce the required memory separation, a subtask may be executed as a separate process within the same VM-T 516 as the calling task. In this embodiment, to execute a subtask, the process running the calling task may be suspended, the subtask may be executed as a separate process, and then the calling task may be resumed. In this embodiment, the memory separation may be enforced by the secure operating system that may run within VM-T 516. In yet another embodiment, if tasks are run within the same VM-S 512, each subtask may run as a separate process within a secure operating system that implements the supervisor 160.

It should be noted that in some embodiments, a separate virtual machine VM-NS 514 with a non-secure operating system running in it may be created for a task (or subtask) so that the supervisor 160 may communicate with this VM-NS 514 while processing requests from the task (subtask). In other embodiments, a separate VM-NS 514 may be created for a group of tasks (or subtasks). In general, in some embodiments, a correspondence between VM-T 516 and VM-NS 514 may be many-to-many.

In some embodiments, task permissions may indicate that the task is allowed to save data permanently in some data storage, for example, a hard disk drive or external storage. To process task requests related to accessing the data storage, in some embodiments the supervisor 160 may request the OS 111 running within VM-NS 514 to create a logical entity that may be used for storing data related to the task, if such an entity has not yet been created before. The logical entity may be, for example, a file. This logical entity may have a unique identifier, which may be assigned, for example, by the OS 111 or by the supervisor 160. After that, task requests to read or write data may be directed through the supervisor 160 and OS 111 running on VM-NS 514 to this logical entity. In some embodiments, data stored on the logical entity may be encrypted, for example, using one of the methods described with respect to encrypting data in external storage, as described herein. In some further embodiments, data stored on the logical entity may be further protected from replay attacks, as described herein.

In some other embodiments, to process task requests related to accessing the data storage, the supervisor 160 may request the hypervisor 385 to create a virtual device and map this virtual device to the corresponding VM-T. The virtual device may be, for example, a Small Computer System Interface (SCSI) virtual device with a separate SCSI ID, or a Serial ATA (Advance Technology Attachment) (SATA) virtual device using virtual SATA channel. After that, task requests to read or write data may be executed by the corresponding VM-T directly on the virtual device. In some embodiments, for example, if the storage 119 is implemented using a RAID (redundant array of independent disks) controller, creating a virtual device may be implemented as instructing the RAID controller to create a RAID logical volume (identified, for example, by a separate SCSI ID).

In the embodiments using an external storage, the supervisor 160 may first receive information necessary for establishing communication with and accessing this storage. The external storage may be an online storage, such as a storage provided in the cloud. The necessary information may include, for example, an address (for example, an URL) of the storage, and may be provided to the supervisor 160, for example, by the administrator's task 175 at the time of a request to load the task. In some embodiments, a task itself may contain the necessary information.

To enhance security, all data to be stored in external storage may first be encrypted by the supervisor 160 and stored in an encrypted format, and may be decrypted when a task requests to read the data. In some embodiments, integrity of the data read from any external storage may also be ensured by cryptographic means. For example, authentication encryption methods may be used to ensure both confidentiality and integrity of the data in external storage. In some embodiments, the supervisor 160 may use device-specific encryption keys to encrypt or decrypt the data. These device-specific encryption keys may be stored in the key storage 330 at the time when the processor 300 is manufactured and may never be exposed outside the processor 300. In other embodiments, an encryption key specific to the device and the task signer may be used, for instance, as described in U.S. Provisional Patent Application 61/664,465, filed Jun. 26, 2012, entitled "Systems, Methods and Apparatuses for the application-Specific Identification of Devices" (the '465 application), the content of which is incorporated herein by reference in its entirety. In this case, any device-specific data for creating such a key may also be stored in the key storage 330, for example, at the time when the processor 300 is manufactured. In other embodiments, the supervisor 160 may generate (e.g., randomly) a symmetric key, and use this symmetric key for data encryption and decryption. This generated symmetric key in some embodiments may itself be encrypted using a key specific to the processor 300, and may be stored, for example, in the key storage 167.

When data stored in the logical volume or in the external storage is encrypted using device-specific keys or symmetric keys protected by the device-specific keys, the data may not be successfully decrypted by a different task running on the same processor 300, or by any task or application running on a different processor. Thus, in case the whole hard drive is stolen, the data security is still protected.

In some embodiments, additional protection from "replay attacks" may be implemented for external storage. For example, some kind of "last written revision" may be stored in an authenticated part of the external storage, and the same "last written revision" may be stored in a secure storage (such as ROM 320). The last written revision may be, for example, an integer, which may be changed (such as incremented or decremented), every time the secure storage is modified. Any "replay attack" by replacing the external storage with an older version may be detected and prevented by comparing the "last written revision" from the external storage with the "last written revision" from the secure storage. In some embodiments, there can be two instances of "last written revision" stored in the local storage while the writing is in progress, and a one-bit switch, to ensure integrity of the data. The one-bit switch may be stored, for example, in the secure storage and may be used in a manner similar to the use of the one-bit switch as described above with respect to updating root certificates.

In addition, methods of encrypting external storage may address the problem of entering passwords when a server is rebooted. For example, a Hypertext Transfer Protocol Secure (HTTPS) web server may store a private key in a password-protected manner or unprotected manner. Password-protected storage may require a system administrator to enter the password manually on each system reboot, and is often inconvenient. Unprotected storage may make the private key vulnerable to security breaches (e.g., copied from the hard drive, or the hard drive being stolen). In some embodiments, the external storage may be encrypted and the private key may be stored as unprotected in such an encrypted storage without risk of security breaches (as long as the private key is stored within the processor 300, moving hard drive to another computer won't create a security breach).

In some embodiments, accessing a data storage may also be available to a subtask using techniques similar to those described herein.

As described herein, in some embodiments, some services including the network services may be provided to a task running in a VM-T 516 by a NS system 152 running in a VM-NS 514. If an operating system running in one of the virtual machines VM-NS 514 has abnormally terminated or has been terminated, some of the operations initiated by tasks may not be completed. For example, the operating system 111 running in a virtual machine VM-NS 514 may implement the TCP/IP stack and provide the network capabilities to a task in a VM-T 516. If the operating system 111 implementing the TCP/IP stack crashes for any reason (e.g., malfunction, or malware acting within the operating system 111), the network connections (e.g., a TCP connection) for the task in the VM-T 516 may be lost. In this case, the supervisor 610 may request the hypervisor 385 to restart an operating system within such a virtual machine and to supply it with the address of a corresponding bus memory block 182. When the operating system is restarted (or even before the restart), the supervisor 160 may inform the task(s) currently running that the connection(s) have closed. The task(s) may then initiate re-establishing the connection(s) if necessary. In some embodiments, when a closed connection is not a secure connection (or the supervisor 160 itself implements connection protection logic, such as SSL/TLS logic, and stores connection protection states, such as SSL/TLS states), and the other side of the connection supports some kind of connection recovery logic, then instead of informing the tasks about the connection being lost, the supervisor 160 may be able to instruct the OS 111 to re-establish a network connection, to invoke connection recovery logic on the other side of the connection, and then to restore the connection without informing any tasks about the connection being broken. In a similar manner, if some data has remained unwritten to the storage because the OS 111 has crashed, in some cases such data may still be written after the OS 111 is restarted.

Figure 9A:
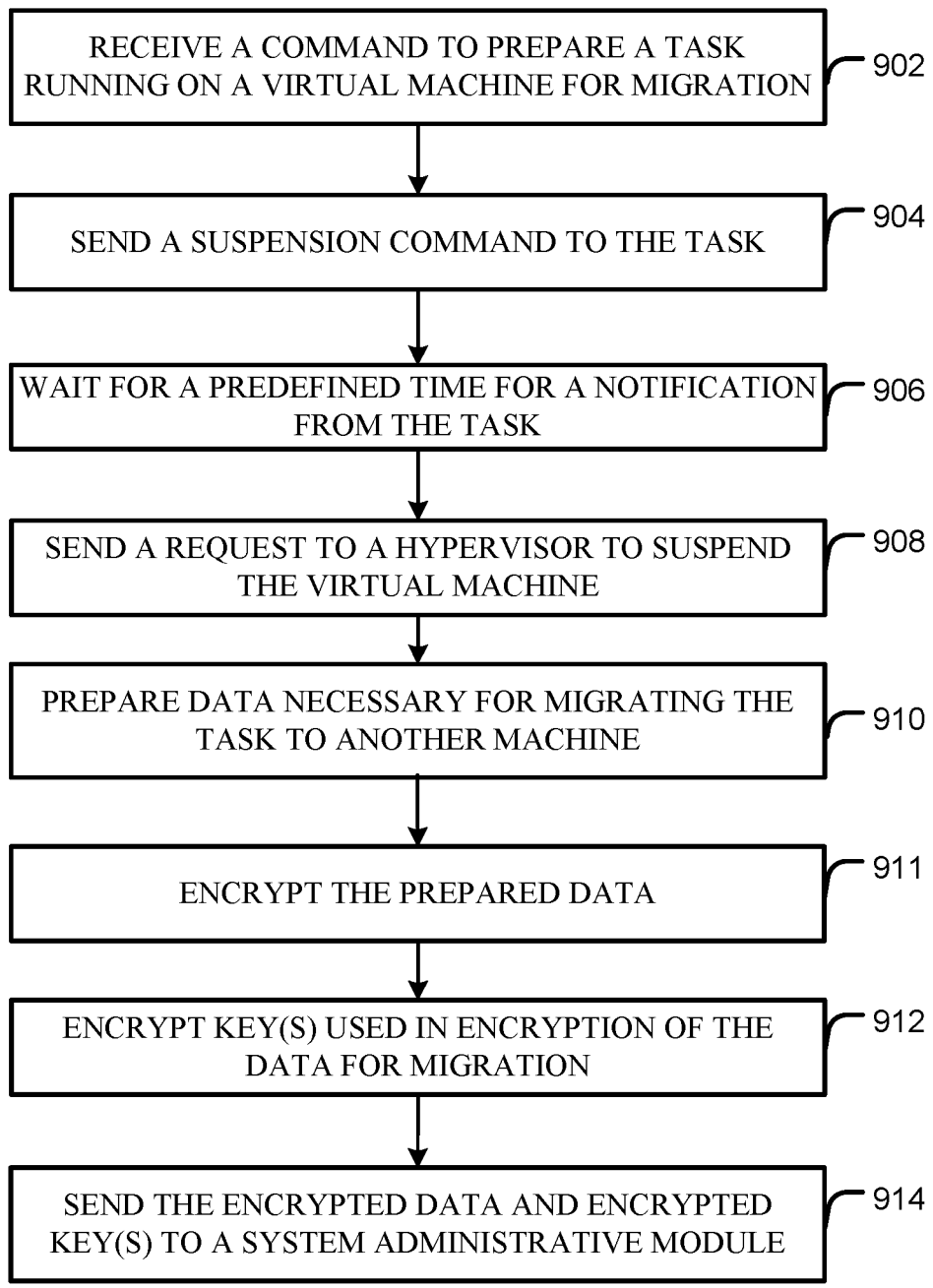
FIG. 9A is a flow diagram showing an exemplary process of moving execution of a task from a source machine processor according to the present disclosure.

In some embodiments, a task being executed on one physical machine may be migrated to another physical machine according to the present disclosure. FIG. 9A is a flow diagram showing an exemplary process 900 of migrating execution of a task from a source machine to a target machine according to the present disclosure.

At block 902, a command may be received to prepare a task currently running in a virtual machine for migration. For example, the supervisor 160 running on a source machine may receive a command from a system administrator via the administrator's task 175 running in the virtual machine VM-AT 517. The command may contain a public key that may be used for encryption of data related to the task to be migrated, and/or other keys used for encryption of data related to the task. For example, this public key may correspond to a private key of a target machine where the task is to be migrated to. In addition, the command may specify where task data should be sent, for example, a network address of the target machine, or the administrator's task 175 running in the VM-AT 517 (e.g., to be forwarded to the system administrator).

At block 904, a suspension command may be sent to the task. For example, in some embodiments, the supervisor 160 may send a command to the running task to prepare for suspension. In these embodiments, the task may, for example, close open connections, save some data locally, and/or perform other actions necessary for graceful suspension. For example, in some embodiments, a task 170 may represent a finite state machine (FSM) changing its state in response to messages received from the supervisor 160. It should be noted that in some embodiments such a FSM may include advanced features such as extended states, hierarchical state machines, orthogonal regions etc. One of the messages may request the task 170 to perform serialization, that is, to create a piece of data sufficient to restore the task state to a latest stable condition. In the message or accompany the message, the supervisor 160 may, for example, supply an address of a memory segment to be used to write the serialized data. After this message is sent to the task 170, the supervisor 160 may stop forwarding any subsequent messages to the task 170, and if there is a subsequent message intended for the task 170, the supervisor 160 may store such messages in a special message queue (not shown).

At block 906, the supervisor 160 may wait for a notification from the task about readiness for suspension. For example, if the task implements an FSM, such notification after sending a request to the task for serialization may be an indication that the task has finished serialization and is ready to accept other messages. At block 908, the supervisor 160 may send a request to the hypervisor 385 to destroy the virtual machine VM-T 516 that is running the task 170.

At block 910, the supervisor 160 may prepare any data necessary for moving the task to another machine. For example, in some embodiments, the supervisor 160 may concatenate one or more of the following: (a) task 170's executable code, (b) the serialized data generated by the task 170 in response to a command sent at block 904, (c) messages from a special message queue, (d) task permissions for the task 170, and (e) if the task 170 has stored data in an encrypted storage as described above, the encryption keys used for encryption of the stored data.

At block 911, the supervisor may encrypt data prepared at block 910. For example, a symmetric key may be randomly generated for encryption. In some embodiments, authenticated encryption methods may be used for encryption.

At block 912, the supervisor 160 may encrypt the encryption key(s) used at block 911. For example, the supervisor 160 may encrypt the symmetric key generated at block 911, as well as any other symmetric key(s) used for encryption of task data stored permanently (if any), with the public key received at block 902.

At block 914, the supervisor 160 may send the encrypted task data and encrypted key(s) used for task data encryption to a destination specified in the request received at block 902. In some embodiments, the supervisor 160 may also perform additional functions as if the task has been terminated. For example, the supervisor 160 may perform some of the functions which have been described in greater details with respect to FIG. 2A and/or FIG. 7.

Figure 9B:
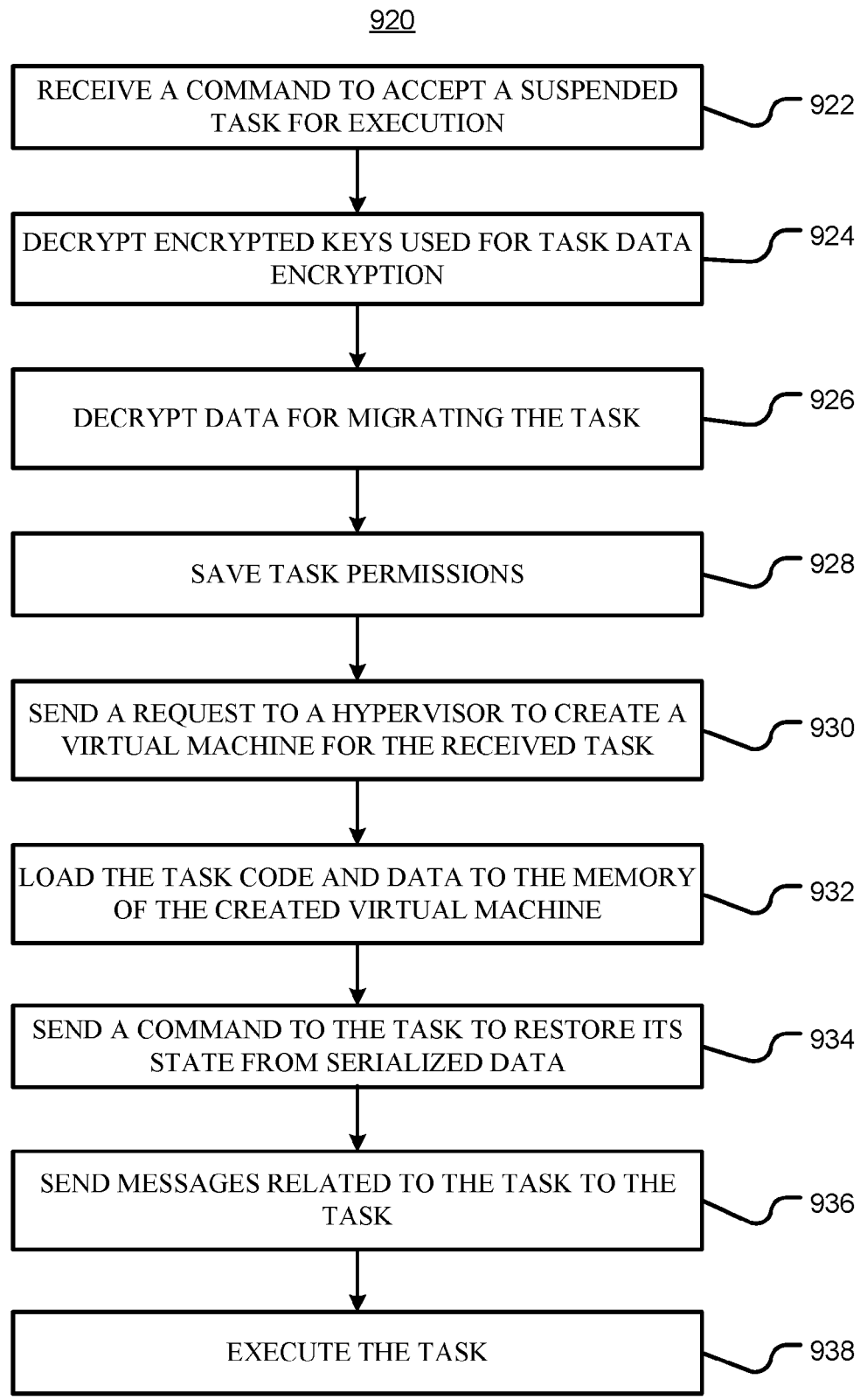
FIG. 9B is a flow diagram showing an exemplary process of receiving and resuming execution of a task at a target machine according to the present disclosure.

FIG. 9B is a flow diagram showing an exemplary process 920 of receiving and resuming execution of a task at a target machine according to the present disclosure.

At block 922, a command may be received by a supervisor 160 of the target machine to accept a task for resuming execution. The command may be received, for example, via the administrator's task 175 at the target machine. This command may contain encrypted task data as well as encrypted encryption key(s) used for task data encryption.

At block 924, the supervisor 160 of the target machine may decrypt, using its private key, encrypted key(s) used for task data encryption, and, at block 926, using these decrypted key(s), the supervisor 160 of the target machine may decrypt the data necessary for moving the task.

At block 928, the supervisor 160 of the target machine may save task permissions. For example, as described above with respect to block 910, the data necessary for moving the task may include task permissions. The supervisor 160 may retrieve the task permissions from the decrypted data necessary for moving the task and save these permissions in its memory. The supervisor 160 may enforce these permissions while the task is running, as described above.

At block 930, the supervisor 160 may send a request to the hypervisor 385 to create a virtual machine VM-T 516 for running the received task, and, at block 932, the supervisor 160 may load the task code and the task serialized data to the memory of the created virtual machine VM-T 516. At block 932, the supervisor 160 may send a request to the hypervisor 385 to run the virtual machine VM-T 516, and, at block 934, the supervisor 160 may send a command to the task to restore its state from serialized data. For example, if the task implements an FSM, the task may receive a message requesting the task 170 to perform de-serialization.

If any messages were received with the data related to the task, at block 936, the supervisor 160 may send those messages to the task. At block 938, the task may be executed, for example, as described above with respect to FIG. 7.

In some embodiments, the processor 300 may support two modes of system boot: secure boot mode and insecure boot mode. In the secure boot mode, the system may behave as described above, allowing to boot a hypervisor only from ROM 320. In the insecure boot mode, the processor 300 may allow a non-secure hypervisor or a non-secure operating system to run (i.e. the processor 300 may be allowed to boot from an arbitrary source), while ensuring that there is no access from this non-secure hypervisor (or non-secure operating system) to any (or some of) security features described above. For example, in the insecure mode, there may be no access (e.g., read or write (modification)) to data stored in the ROM 320, private key storage 330, or certificate storage 340. Also, the secure timer 335 may be implemented in a way that it cannot be reset or somehow modified when the system is in the non-secure mode (but in some embodiments, it may be allowed to be read).

In some embodiments, a security-enhancing chip (not shown) external to the processor 300 may be used to implement certain features of the processor 300 as it will be discussed in greater details below. In these embodiments, the security-enhancing chip may be connected to the processor 300. For example, both the security-enhancing chip and the processor 300 may be assembled on the same main board and connected via a bus, such as, for example, an I$^2$C bus or PCIe bus. Further, the security-enhancing chip may be configured (i) to receive data related to the current hardware (for example, the type of processor, boot mode, etc.) and/or software configuration (for example, a secure hash of the image of a hypervisor, supervisor, etc.), (ii) to create a configuration digest, and (iii) to have one or more shielded locations to store data that may be accessible only by a specific hardware and/or software configuration. An example of a chip implementing similar functionality is a Trusted Platform Module (TPM) as defined in "TCG Specification Architecture Overview Specification Revision 1.4," published August 2007 by the Trusted Computing Group (TCG), the content of which is incorporated by reference in its entirety and referred to hereinafter as the "TCG Specification." In embodiments where TPM is used, the configuration digest mentioned above may be implemented via TPM measurement events (each providing information about properties and characteristics of a measured system component). The TPM measurement events may be then combined (using, for example, a secure hash function) in TPM Program Configuration Registers, as described in the TCG Specification. Also, in embodiments using the TPM, the shielded locations may be implemented, for example, via TPM "sealing" (such as "Sealed BLOB structures"), using TPM Program Configuration Registers to protect access to the sealed data.

In one of such embodiments, when a system containing such a processor 300 and security-enhancing chip is produced (or assembled from an already produced processor 300 and security-enhancing chip), the one or more shielded locations may be generated and stored within such a system. For example, it may be stored as an TPM Protected External Storage, such as a sealed BLOB structure, with only encryption keys residing within the TPM, and the data itself residing, for example, in an external ROM (not shown) or on an external HDD/SSD (not shown). Alternatively, the data itself may be stored within such a security-enhancing chip. Such shielded location(s) may be used, for example, to store the certificate storage 540 and/or the private key storage 530 for this system. In some embodiments, this shielded location may be made accessible only if the configuration digest of the current system (e.g., hardware, software, or both) is identical to a pre-specified configuration digest. This may be used to ensure that the current hardware platform is identical to a pre-specified platform, and in embodiments where a secure hash of hypervisor 385 is a part of configuration digest this may ensure that a pre-specified hypervisor 385 (identified, for example, by its secure hash) is currently running. For example, in embodiments where TPM is used, for the program running on a processor 300 to access the TPM sealed BLOB structures, the current state of the TPM Platform Configuration Registers may need to be identical to the state of the Platform Configuration Registers which were used to seal the TPM sealed BLOB structure(s). In embodiments where the TPM Platform Configuration Registers contain a secure hash of a hypervisor, it provides assurance that only the pre-specified hypervisor may access the data in the sealed BLOB structure.

It should be noted that in some embodiments a configuration digest may include not only a secure hash of the hypervisor, but also, for example, a secure hash of the supervisor. Further, elements of the configuration may include certain hardware elements. This may be used, for example, to ensure that only a platform providing the necessary (software and hardware) elements related to security is considered by the security-enhancing chip as a secure platform, and, correspondingly, only such a platform is granted access to respective shielded locations.

In some embodiments using a security-enhancing chip, the secure timer 335 may be implemented as a part of security-enhancing chip. In other embodiments using a security-enhancing chip, the secure timer 335 may be implemented in software, for example, using one or more shielded locations to store current values securely.

In some embodiments (regardless of the security enhancing chip being used), the usual RAM may be used to implement functionality of the secure RAM 325. This may be a reasonable solution, for example, if the owner of a system that contains the processor 300 considers a physical attack to be unlikely.

In some embodiments, techniques described above may be combined to implement a system based on existing computer systems that contain a TPM chip. It should be noted that in such embodiments a processor 300 may not necessarily have components such as the ROM 320, secure timer 335, certificate storage 340, and/or private key storage 330, and therefore, in some of such embodiments, a processor 300 may consist only of the CPU 305.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A computer-implemented method for providing secure computing environment on a computer processor, comprising:
    initializing a hypervisor on the computer processor;
    establishing a first virtual machine under control of the hypervisor; and
    executing code for a secure zone on the first virtual machine, including:
        verifying an administrative task;
        executing the administrative task, wherein the executing comprises:
            establishing a connection with an administrator device;
            requesting an attestation certificate from the administrator device;
            verifying that the attestation certificate is issued by a trusted attestation service provider;
            receiving a command through the connection with the administrator device;
            in response to the command, executing on a second virtual machine a task that calls a subtask, wherein the second virtual machine is established under control of the hypervisor; and suspending execution of the task according to one or more time slices apportioned to the first virtual machine by the hypervisor while the subtask is executed by the second virtual machine;
        establishing a connection to a client device;
        verifying that the client device is allowed to establish a connection to the task executing on the second virtual machine; and
        passing the established connection to the client device to the task executing on the second virtual machine.

2. The computer-implemented method of claim 1, wherein executing the administrative task further comprises verifying that the administrator device contains a private key that corresponds to a public key of a set of public keys.

3. The computer-implemented method of claim 2, wherein the set of public keys are stored within data of the first virtual machine.

4. The computer-implemented method of claim 1, wherein executing the administrative task further comprises ensuring that a client administrative task running on the administrator device is one of a set of valid client administrative tasks.

5. The computer-implemented method of claim 4, wherein ensuring the client administrative task running on the administrator device is one of a set of valid client administrative tasks comprises:
receiving a hash value of the client administrative task running on the administrator device; and
checking the received hash value against a list of hash values of valid client administrative tasks.

6. The computer-implemented method of claim 1, wherein the computer processor is coupled to a non-volatile storage exclusively accessible by the secure zone, and wherein verifying the administrative task comprises calculating a checksum of the administrative task and verifying the calculated checksum using information from the non-volatile storage.

7. The computer-implemented method of claim 6, wherein the checksum is a secure hash.

8. The computer-implemented method of claim 1, wherein the computer processor is coupled to a non-volatile storage exclusively accessible by the secure zone, and wherein executing the administrative task further comprises generating and permanently saving information about a system configuration in the non-volatile storage and using the information on system start.

9. The computer-implemented method of claim 1, wherein verifying the administrative task further comprises:
verifying that the administrative task is signed by a signature as an administrator task; and
verifying the signature of the administrative task.

10. An apparatus for providing a secure computing environment, comprising:
a communication port; and
a computer processor coupled to the communication port and configured to:
initialize a hypervisor;
establish a first virtual machine under control of the hypervisor; and
execute code for a secure zone on the first virtual machine, including:
verify an administrative task;
execute the administrative task, wherein to execute the
administrative task the computer processor is further configured to:
establish a connection with an administrator device;
request an attestation certificate from the administrator device;
verify that the attestation certificate is issued by a trusted attestation service provider;
receive a command through the connection with the administrator device;
in response to the command, execute on a second virtual machine a task that calls a subtask, wherein the second virtual machine is established under control of the hypervisor; and
suspend execution of the task according to one or more time slices apportioned to the first virtual machine by the hypervisor while the subtask is executed by the second virtual machine;
establish a connection to a client device;
verify that the client device is allowed to establish a connection to the task executed on the second virtual machine; and
pass the established connection to the client device to the task executed on the second virtual machine.

11. The apparatus of claim 10, wherein to execute the administrative task the computer processor is further configured to verify that the administrator device contains a private key that corresponds to a public key of a set of public keys.

12. The apparatus of claim 11, wherein the set of public keys are stored within data of the first virtual machine.

13. The apparatus of claim 10, wherein to execute the administrative task the computer processor is further configured to ensure that a client administrative task running on the administrator device is one of a set of valid client administrative tasks.

14. The apparatus of claim 13, wherein to ensure that the client administrative task running on the administrator device is one of a set of valid client administrative tasks, the computer processor is further configured to:
receive a hash value of the client administrative task running on the administrator device; and
check the received hash value against a list of hash values of valid client administrative tasks.

15. The apparatus of claim 10, wherein the apparatus further comprises a non-volatile storage exclusively accessible by the secure zone, and to verify the administrative task the computer processor is further configured to calculate a checksum of the administrative task and to verify the calculated checksum using information from the non-volatile storage.

16. The apparatus of claim 15, wherein the checksum is a secure hash.

17. The apparatus of claim 1, wherein the apparatus further comprises a non-volatile storage exclusively accessible by the secure zone, and to execute the administrative task the computer processor is further configured to generate and permanently save information about a system configuration in the non-volatile storage and use the information on system start.

18. The apparatus of claim 10, wherein to verify the administrative task the computer processor is further configured to:
verify that the administrative task is signed by a signature as an administrator task; and
verify the signature of the administrative task.

19. A system for providing a secure computing environment, comprising:
an administrator device comprising a secure zone configured to execute a client administrative task;
an apparatus, comprising:
a communication port; and
a computer processor coupled to the communication port and configured to:
initialize a hypervisor;
establish a first virtual machine under control of the hypervisor; and
execute code for a secure zone on the first virtual machine, including:
verify an administrative task,
execute the administrative task, wherein to execute the administrative task the computer processor is further configured to:
establish a connection with the administrator device;

request an attestation certificate from the administrator device;
verify that the attestation certificate is issued by a trusted attestation service provider;
receive a command through the connection with the administrator device;
in response to the command, execute on a second virtual machine a task that calls a subtask, wherein the second virtual machine is established under control of the hypervisor; and
suspend execution of the task according to one or more time slices apportioned to the first virtual machine by the hypervisor while the subtask is executed by the second virtual machine;
establish a connection to a client device;
verify that the client device is allowed to establish a connection to the task executed on the second virtual machine; and
pass the established connection to the client device to the task executed on the second virtual machine;
wherein to execute the client administrative task, the secure zone of the administrator device is further configured to:
establish the connection with the apparatus; and
send the command through the connection with the apparatus.

20. The system of claim 19, wherein to execute the administrative task the computer processor is further configured to verify that the administrator device contains a private key that corresponds to a public key of a set of public keys.

21. The system of claim 20, wherein the set of public keys are stored within data of the first virtual machine.

22. The system of claim 19, wherein to execute the administrative task the computer processor is further configured to ensure that the client administrative task executed on the administrator device is one of a set of valid client administrative tasks.

23. The system of claim 22, wherein to ensure that the client administrative task executed on the administrator device is a one of set of valid client administrative tasks, the administrator device is configured to report a hash value of the administrative task executed on the administrator device and the computer processor is further configured to:
receive the hash value of the client administrative task executed on the administrator device; and
check the received hash value against a list of hash values of valid client administrative tasks.

24. The system of claim 19, wherein the apparatus further comprises a non-volatile storage exclusively accessible by the secure zone on the first virtual machine, and to verify the administrative task the computer processor is further configured to calculate a checksum of the administrative task and to verify the calculated checksum using information from the non-volatile storage.

25. The system of claim 24, wherein the checksum is a secure hash.

26. The system of claim 19, wherein the apparatus further comprises a non-volatile storage exclusively accessible by the secure zone on the first virtual machine, and to execute the administrative task the computer processor is further configured to generate and permanently save information about an apparatus configuration in the non-volatile storage and use the information on apparatus start.

27. The system of claim 19, wherein to verify the administrative task the computer processor is further configured to:
verify that the administrative task is signed by a signature as an administrator task; and
verify the signature of the administrative task.

* * * * *